(12) United States Patent
Chou et al.

(10) Patent No.: US 11,531,181 B2
(45) Date of Patent: *Dec. 20, 2022

(54) IMAGING LENS MODULE AND ELECTRONIC DEVICE

(71) Applicant: LARGAN PRECISION CO., LTD., Taichung (TW)

(72) Inventors: Ming-Ta Chou, Taichung (TW); Lin-An Chang, Taichung (TW); Ruei-Yang Luo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 626 days.

This patent is subject to a terminal disclaimer.

(21) Appl. No.: 16/558,048

(22) Filed: Aug. 31, 2019

(65) Prior Publication Data

US 2020/0310073 A1 Oct. 1, 2020

(30) Foreign Application Priority Data

Mar. 29, 2019 (TW) ................................ 108111393

(51) Int. Cl.
*G02B 7/02* (2021.01)
*G02B 5/00* (2006.01)
*G02B 27/00* (2006.01)

(52) U.S. Cl.
CPC ............. *G02B 7/022* (2013.01); *G02B 7/021* (2013.01); *G02B 5/003* (2013.01); *G02B 5/005* (2013.01); *G02B 27/0018* (2013.01)

(58) Field of Classification Search
CPC ........ G02B 5/003; G02B 5/005; G02B 7/021; G02B 7/022; G02B 27/0018
See application file for complete search history.

(56) References Cited

U.S. PATENT DOCUMENTS 7,530,699 B2 * 5/2009 Shulepova ............... G02B 3/00
359/605
9,638,838 B1 * 5/2017 Fan .................... G02B 27/0018
(Continued)

FOREIGN PATENT DOCUMENTS

CN 204650004 U 9/2015
CN 204758902 U 11/2015
(Continued)

*Primary Examiner* — Nicholas R. Pasko
(74) *Attorney, Agent, or Firm* — McClure, Qualey & Rodack, LLP

(57) ABSTRACT

An imaging lens module includes at least one plastic lens element having an optical axis, an object side and an image side. The plastic lens element includes, in order from a center to a peripheral region thereof, an optical effective portion and an outer peripheral portion. The outer peripheral portion surrounds the optical effective portion, wherein the outer peripheral portion includes, on at least one of the object side and the image side, a plurality of groove structures and a contacting surface. The contacting surface is an annular plane and perpendicular to the optical axis. The groove structures and the contacting surface are located on the same side. There is an air gap between the groove structures and at least one optical element adjacent thereto. The groove structures and the contacting surface located on the same side are not overlapped along a direction parallel to the optical axis.

24 Claims, 33 Drawing Sheets

(56) References Cited

U.S. PATENT DOCUMENTS

| | | | |
|---|---|---|---|
| 9,753,243 B2 | 9/2017 | Chou | |
| 9,798,048 B2 * | 10/2017 | Chou | ................ G02B 3/04 |
| 9,864,160 B2 | 1/2018 | Lin et al. | |
| 9,904,050 B2 | 2/2018 | Lin et al. | |
| 10,001,624 B2 | 6/2018 | Tsai et al. | |
| 10,018,808 B2 | 7/2018 | Chou | |
| 10,114,152 B2 | 10/2018 | Chou | |
| 10,139,526 B2 | 11/2018 | Chou | |
| 10,151,900 B2 | 12/2018 | Lin et al. | |
| 10,197,761 B2 | 2/2019 | Lin et al. | |
| 10,564,383 B2 * | 2/2020 | Chou | ............... G02B 27/0018 |
| 2014/0063625 A1 | 3/2014 | Kim et al. | |
| 2015/0062727 A1 * | 3/2015 | Kang | ............... G02B 27/0018 |
| | | | 359/793 |
| 2015/0146310 A1 * | 5/2015 | Choi | ................ G02B 7/021 |
| | | | 359/793 |
| 2016/0349476 A1 * | 12/2016 | Lin | ................ G02B 7/026 |
| 2018/0292626 A1 | 10/2018 | Chou | |
| 2020/0142150 A1 * | 5/2020 | Chou | ................ G02B 7/022 |

FOREIGN PATENT DOCUMENTS

| | | |
|---|---|---|
| CN | 205103485 U | 3/2016 |
| CN | 205139406 U | 4/2016 |
| CN | 205450423 U | 8/2016 |
| CN | 205485018 U | 8/2016 |
| CN | 205899059 U | 1/2017 |
| CN | 205899116 U | 1/2017 |
| CN | 108693629 A | 10/2018 |
| TW | M512712 U | 11/2015 |
| TW | I612354 B | 1/2018 |
| TW | I639029 B | 10/2018 |

* cited by examiner

IMAGING LENS MODULE AND ELECTRONIC DEVICE

RELATED APPLICATION

This application claims priority to Taiwan Application Serial Number 108111393, filed Mar. 29, 2019, which is herein incorporated by reference.

BACKGROUND

Field of Invention

The present disclosure relates to an imaging lens module. More particularly, the present disclosure relates to an imaging lens module applied to portable electronic devices.

Description of Related Art

Recently, portable electronic devices, such as intelligent electronic devices, tablets, etc., are developed rapidly and have been filled with the lives of modern people. Accordingly, the imaging lens module disposed on the portable electronic device is also flourished. However, as technology is more and more advanced, demands for the quality of the imaging lens module of users have become higher and higher. Therefore, not only the quality of the optical design of the imaging lens module should be improved, but the precision in manufacturing and assembling also needs to be improved.

SUMMARY

According to one aspect of the present disclosure, an imaging lens module includes at least one plastic lens element having an optical axis, an object side and an image side, wherein the at least one plastic lens element includes, in order from a center to a peripheral region thereof, an optical effective portion and an outer peripheral portion. The optical axis passes through the optical effective portion. The outer peripheral portion surrounds the optical effective portion, wherein the outer peripheral portion includes, on at least one of the object side and the image side, a plurality of groove structures and a contacting surface. The contacting surface is an annular plane and perpendicular to the optical axis, wherein the contacting surface is connected to at least one optical element adjacent thereto. The groove structures and the contacting surface are located on the same side, there is an air gap between the groove structures and at least one optical element adjacent thereto, and the groove structures and the contacting surface located on the same side are not overlapped along a direction parallel to the optical axis.

According to another aspect of the present disclosure, an electronic device includes the imaging lens module of the aforementioned aspect and an image sensor disposed on an image surface of the imaging lens module.

According to further another aspect of the present disclosure, an imaging lens module includes at least one plastic lens element having an optical axis, an object side and an image side, wherein the at least one plastic lens element includes, in order from a center to a peripheral region thereof, an optical effective portion and an outer peripheral portion. The optical axis passes through the optical effective portion. The outer peripheral portion surrounds the optical effective portion, wherein the outer peripheral portion includes, on each of the object side and the image side, a plurality of groove structures, wherein the groove structures arrange along a circumference direction surrounding the optical axis.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
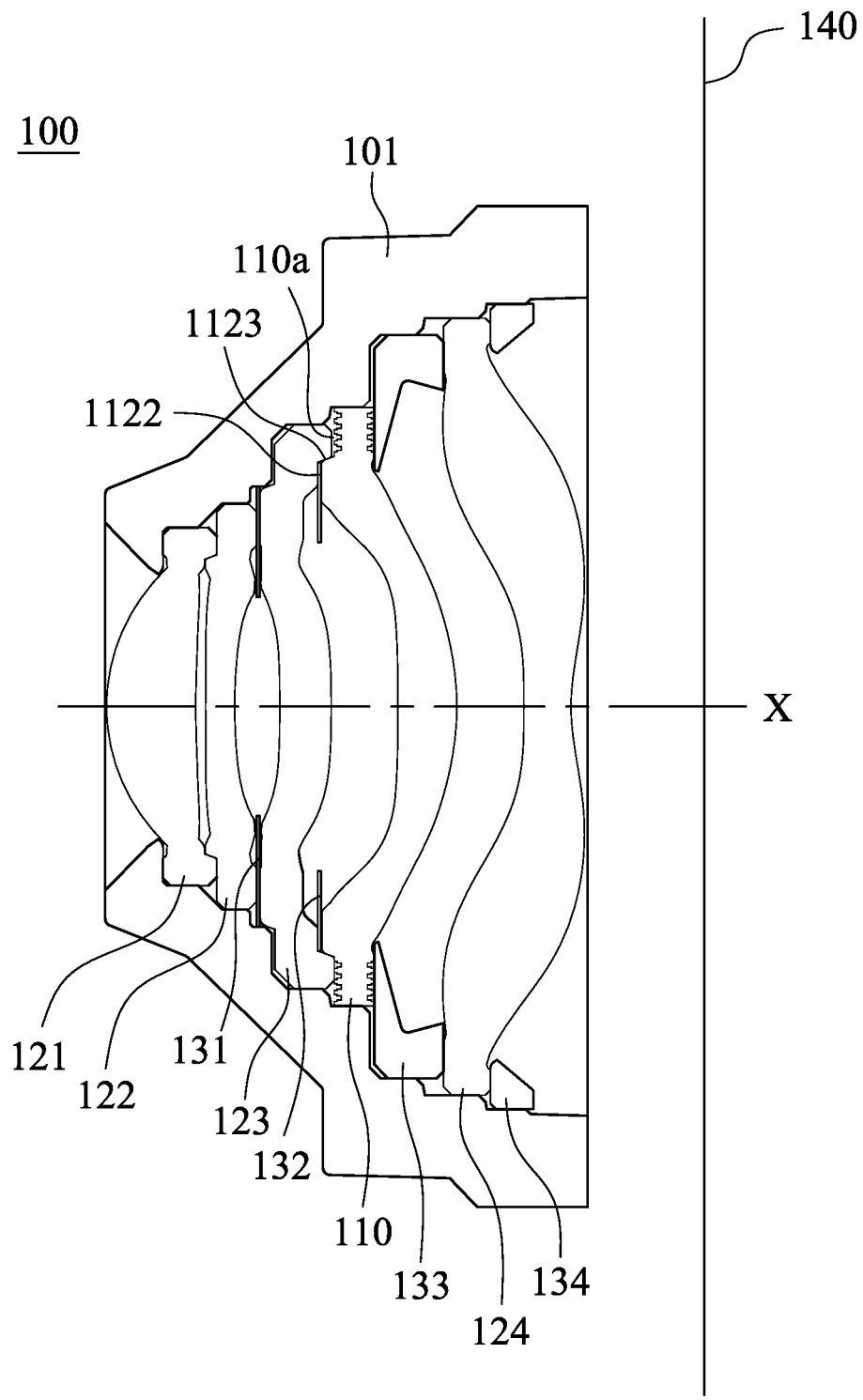
FIG. 1A is a schematic view of an imaging lens module according to the 1st embodiment of the present disclosure.

The present disclosure provides an imaging lens module including at least one plastic lens element having an optical axis, an object side and an image side, wherein the at least one plastic lens element includes, in order from a center to a peripheral region thereof, an optical effective portion and an outer peripheral portion. The optical axis passes through the optical effective portion. The outer peripheral portion surrounds the optical effective portion. The outer peripheral portion includes, on at least one of the object side and the image side, a plurality of groove structures. By the arrangement of the groove structures, the eliminating efficiency of stray light can be enhanced effectively. Furthermore, the outer peripheral portion can include a plurality of groove structures on both of the object side and the image side. Therefore, by the processing technique for disposing surficial structure on both sides of the plastic lens element, the eliminating efficiency of stray light can be further enhanced.

The outer peripheral portion can further include a contacting surface on one of the object side and the image side. The contacting surface is an annular plane and perpendicular to the optical axis, wherein the contacting surface is connected to at least one optical element adjacent thereto. The optical element can be, but not limited to, a lens element, a light blocking sheet, a spacer, or a barrel. The groove structures and the contacting surface are located on the same side. There is an air gap between the groove structures and at least one optical element adjacent thereto. The groove structures and the contacting surface on the same side are not overlapped along a direction parallel to the optical axis. Therefore, it is favorable for miniaturizing the size of the imaging lens module.

The groove structures are arranged along a direction of a circumference surrounding the optical axis. Therefore, it is favorable for improving the denseness of the arrangement of the groove structure so as to provide the feasibility for processing by the injection molding method. It is worth to be mentioned that the groove structures can be arranged at a cycle at least on the object side or the image side of the outer peripheral portion, and the cycle arrangement means that the groove structures are arranged along the circumference direction in predetermined intervals.

At least three of the groove structures are arranged along a radial direction of the optical axis. Therefore, it is favorable for improving the denseness of the arrangement of the groove structure arrangement so as to provide the feasibility for processing by the injection molding method.

The at least one of the object side and the image side of the outer peripheral portion can further include a plurality of separation surfaces respectively surrounding each of the groove structures. Therefore, it is favorable for maintaining a better forming efficiency under an easier processing method so as to maintain the outward appearance stability of the miniaturized structure. Furthermore, both of the object side and the image side of the outer peripheral portion can further include a plurality of separation surfaces. The separation surfaces can be used for connecting with the optical element adjacent thereto.

At least one of the groove structures can include a light absorbing layer. Therefore, it is favorable for eliminating the stray light delivered from the reflection inside the plastic lens element. In detail, the light absorbing layer can be made of a black material, and the disposing method thereof can be coating or plating.

The groove structures located on one of the object side and the image side and the optical effective portion located on the other side of the object side and the image side are overlapped along a direction parallel to the optical axis. Therefore, it is favorable for increasing the probability for the groove structures to intercept stray light.

The contacting surface can include a conical surface contacting with and being concentric alignment to a lens element adjacent thereto. Therefore, it is favorable for improving the concentric accuracy of the imaging lens module so as to reduce the assembly tolerance. Furthermore, the contacting surface can be used for connecting with an optical element, such as a lens element, a light blocking sheet, a spacer, or a barrel.

The conical surface can be farther from the optical axis than the groove structures. Therefore, the assembly accuracy and the efficacy for effectively shading the stray light can be satisfied simultaneously.

The conical surface is disposed between the groove structures and the optical effective portion along a direction perpendicular to the optical axis. Therefore, the assembly accuracy and the efficacy for effectively shading the stray light can be satisfied simultaneously.

Each of the groove structures includes a first structure, a second structure and a step surface, and the step surface is disposed between the first structure and the second structure. Therefore, the surface area of the groove structures can be increased, so that the eliminating efficiency of stray light from the reflection inside the plastic lens element can be enhanced, and the adhesion of the light adsorption layer can be improved.

When a depth of the first structure is D1, and a depth of the second structure is D2, the following condition can be satisfied: $0.3 < D1/D2 < 3$. Therefore, the feasibility for processing by the injection molding method can be provided so as to improve the adhesion of the light adsorption layer.

When a maximum outer diameter of the optical effective portion on the object side and on the image side is $\varphi 1$, and a minimum inner diameter of the groove structures on the object side and on the image side is $\varphi 3$, the following condition can be satisfied: $\varphi 3 < \varphi 1$. Therefore, it is favorable for eliminating the high-intensity stray light from the light source appearing in the visual angle during real shot.

When a number of the groove structures located on one of the object side and the image side is N1 (in the present disclosure, the number of the groove structures on the object side is N1), the following condition can be satisfied:

30≤N1≤720. Therefore, it is favorable for increasing the arrangement denseness of the groove structure so as to provide the feasibility for processing by the injection molding method.

When a number of the groove structures on the other side of the object side and the image side is N2 (in the present disclosure, the number of the groove structure on the image side is N2), the following condition can be satisfied: 30≤N2≤720. Therefore, it is favorable for increasing the arrangement denseness of the groove structure so as to provide the feasibility for processing by the injection molding method.

The groove structures located on the object side and the groove structures on the image side are alternately arranged along a circumference direction surrounding the optical axis and are not overlapped along a direction parallel to the optical axis. Therefore, it is favorable for forming a turbulent flow during the injection molding process of the plastic lens element so as to enhance the quality of the plastic lens element.

When the maximum outer diameter of the optical effective portion on the object side and on the image side is φ1, a maximum outer diameter of the groove structures on the object side and on the image side is φ2, and the minimum inner diameter of the groove structures on the object side and on the image side is φ3, the following condition can be satisfied: 0.05<(φ2−φ3)/φ1<1.0. Therefore, the arrangement range of the groove structures can cover the main path of most of the stray light, so that the stray light can be shaded more effectively. Furthermore, the following condition can be satisfied: 0.1<(φ2−φ3)/φ1<0.75.

When a maximum width of the outer peripheral portion parallel to the optical axis is Wmax, and a maximum depth of the groove structures is d, the following condition can be satisfied: 0.05<d/Wmax<0.55. Therefore, the arrangement range of the groove structures can cover the main path of most of the stray light, so that the stray light can be shaded more effectively. Furthermore, the following condition can be satisfied: 0.10<d/Wmax<0.35.

Each of the groove structures includes an opening, each of the groove structures is recessed from the opening toward the plastic lens element along the optical axis. Therefore, it is favorable for miniaturizing the size of the imaging lens module and the stray light can be shaded more effectively. Furthermore, a shape of the opening of each groove structure can be rectangular-shaped. Therefore, the feasibility for processing by the injection molding method can be provided, and the outward appearance stability of the miniaturized structure can be maintained.

Each of the aforementioned features of the imaging lens module of the present disclosure can be utilized in numerous combinations, so as to achieve the corresponding functionality.

The present disclosure further provides an electronic device including the aforementioned imaging lens module and an image sensor disposed on an image surface of the imaging lens module. Therefore, it is favorable for providing a miniaturization electronic device having the better imaging quality.

1ST EMBODIMENT

FIG. 1A is a schematic view of an imaging lens module 100 according to the 1st embodiment of the present disclosure. As shown in FIG. 1A, the imaging lens module 100 includes a barrel 101, a plastic lens element 110, a plurality of optical elements and an image surface 140, wherein the optical elements are respectively a lens element 121, a lens element 122, a light blocking sheet 131, a lens element 123, a light blocking sheet 132, a spacer 133, a lens element 124 and a fixing ring 134. All of the plastic lens element 110, the lens element 121, the lens element 122, the light blocking sheet 131, the lens element 123, the light blocking sheet 132, the spacer 133, the lens element 124 and the fixing ring 134 are disposed in the barrel 101, and the image surface 140 is disposed on an image side of the barrel 101.

Figure 1B:
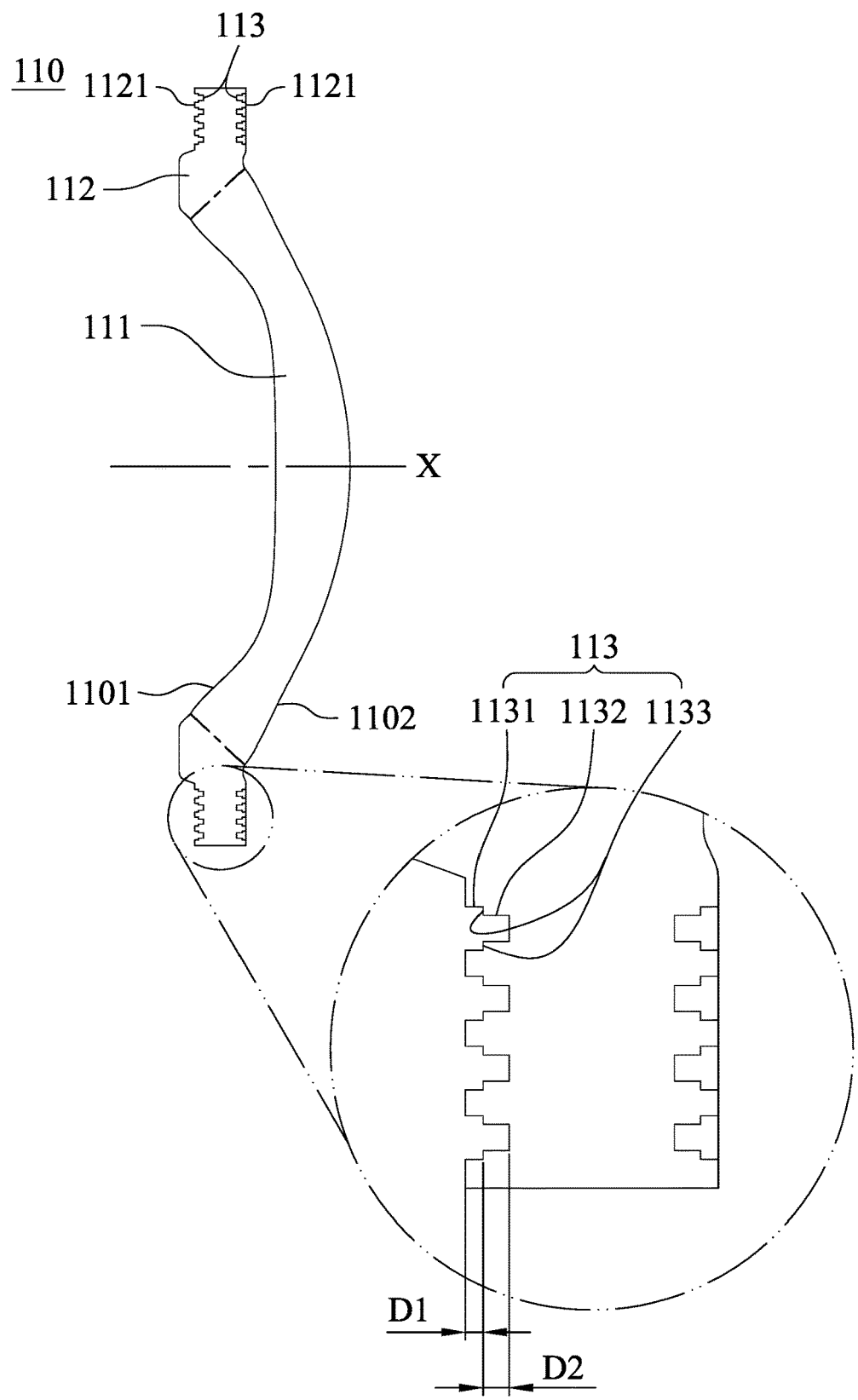
FIG. 1B is a schematic view of a plastic lens element according to the 1st embodiment in FIG. 1A.
Figure 1C:
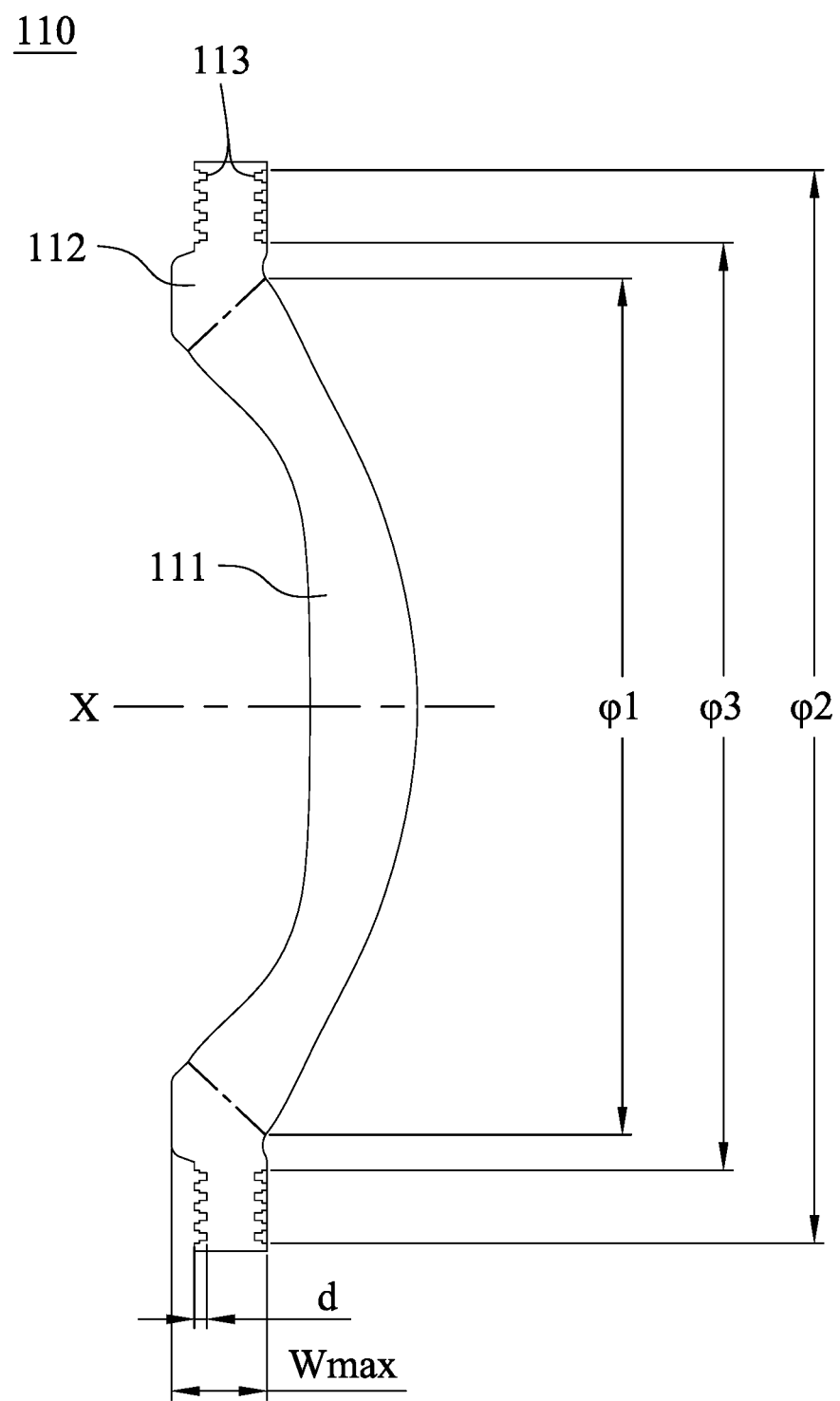
FIG. 1C is a schematic view of the parameters according to the 1st embodiment in FIG. 1A.

FIG. 1B is a schematic view of the plastic lens element 110 according to the 1st embodiment in FIG. 1A, and FIG. 1C is a schematic view of the parameters according to the 1st embodiment in FIG. 1A. As shown in FIG. 1A, FIG. 1B and FIG. 1C, the plastic lens element 110 has an optical axis X, an object side 1101 and an image side 1102, and the plastic lens element 110 includes, in order from a center to a peripheral region thereof, an optical effective portion 111 and an outer peripheral portion 112. The optical axis X passes through the optical effective portion 111, and the outer peripheral portion 112 surrounds the optical effective portion 111. The outer peripheral portion 112 includes, on the object side 1101 and on the image side 1102, a plurality of groove structures 113, respectively. Each of the groove structures 113 includes a first structure 1131, a second structure 1132 and a step surface 1133, and the step surface 1133 is disposed between the first structure 1131 and the second structure 1132. Each of the groove structures 113 include an opening (reference number is omitted), and each of the groove structures 113 is recessed from the opening toward the plastic lens element 110 along the optical axis X. In other words, each of the groove structures 113 is recessed from a direction that the first structure 1131 toward the second structure 1132 along the optical axis X. Please refer to the following FIG. 1F, a shape of the opening can be rectangular-shaped, but the present disclosure is not limited thereto.

Figure 1D:
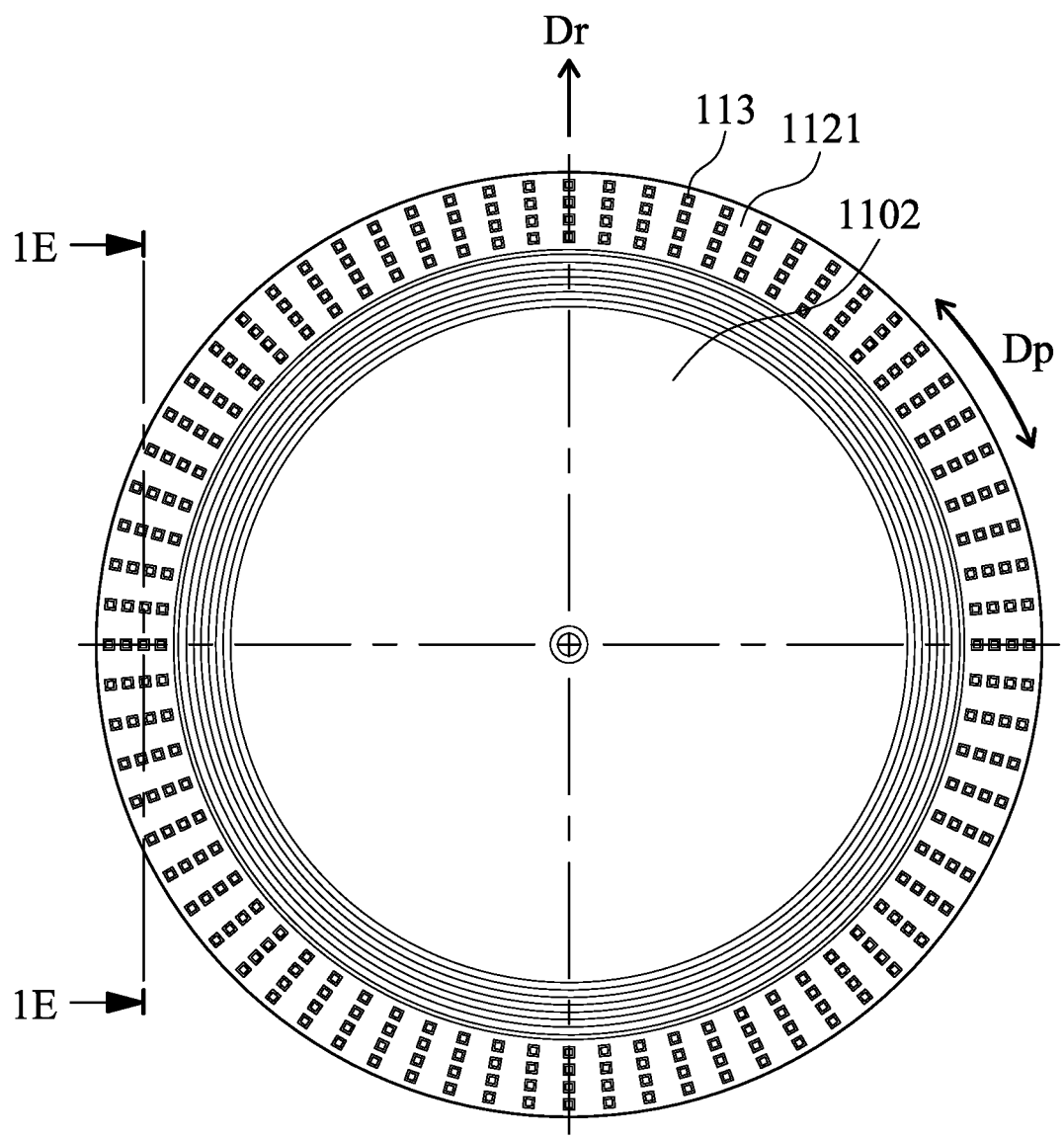
FIG. 1D is a schematic plan view of an image side of the plastic lens element according to the 1st embodiment in FIG. 1A.
Figure 1E:
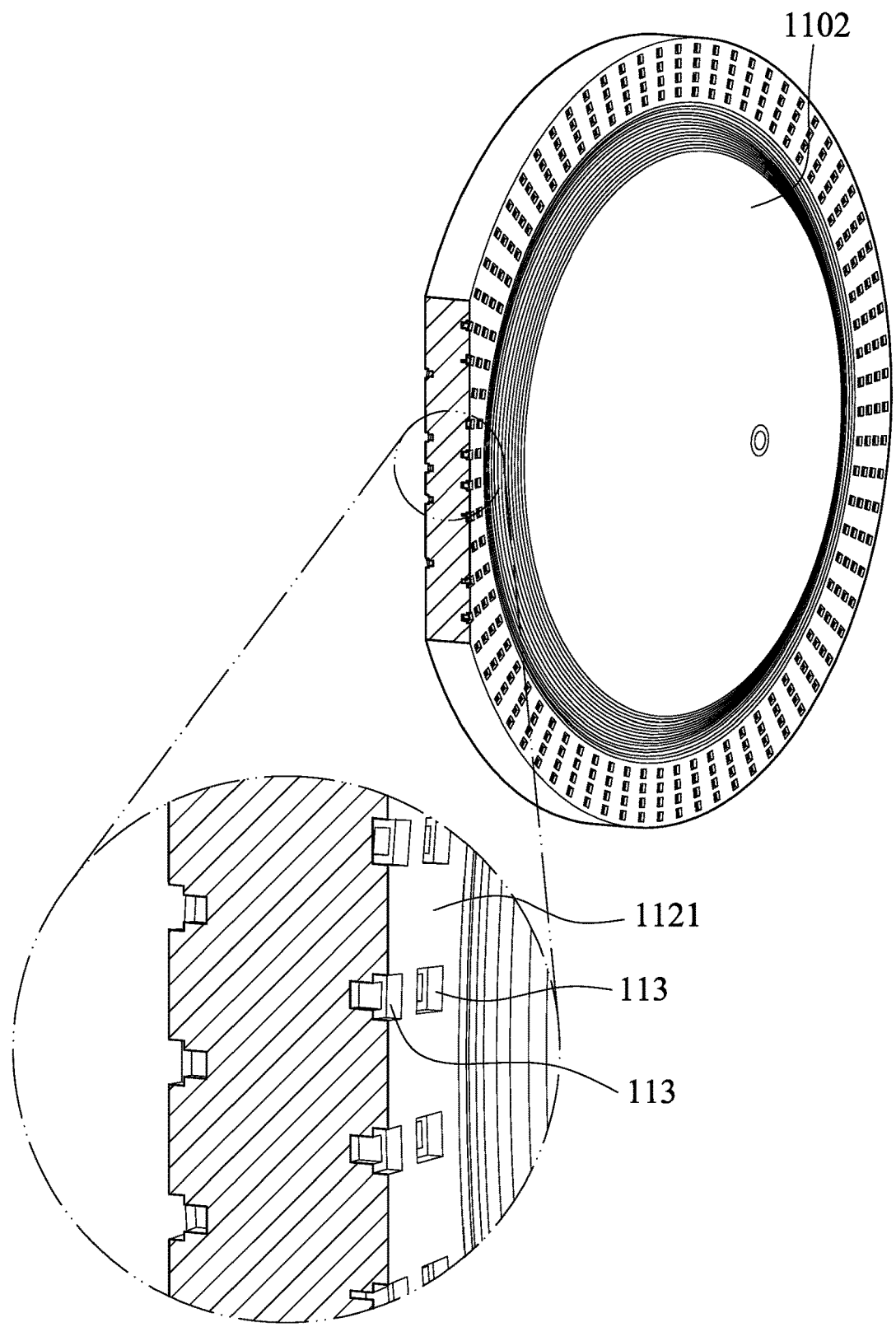
FIG. 1E is a schematic view along a sectional line 1E-1E in FIG. 1D.

FIG. 1D is a schematic plan view of the image side 1102 of the plastic lens element 110 according to the 1st embodiment in FIG. 1A, and FIG. 1E is a schematic view along a sectional line 1E-1E in FIG. 1D. The outer peripheral portion 112 includes the groove structures 113 on the image side 1102, and the groove structures 113 are arranged along a circumference direction Dp surrounding the optical axis X. At least three of the groove structures 113 are arranged along a radial direction Dr of the optical axis X. In detail, in the 1st embodiment, on the image side 1102, four groove structures 113 of the outer peripheral portion 112 are arranged along the radial direction Dr of the optical axis X, wherein the radial direction Dr is only used to illustrate, and the radial direction along the optical axis X of the plastic lens element 110 is not limited thereto. The outer peripheral portion 112 further includes a plurality of separation surfaces 1121 on the image side 1102 respectively surrounding each of the groove structures 113.

Figure 1F:
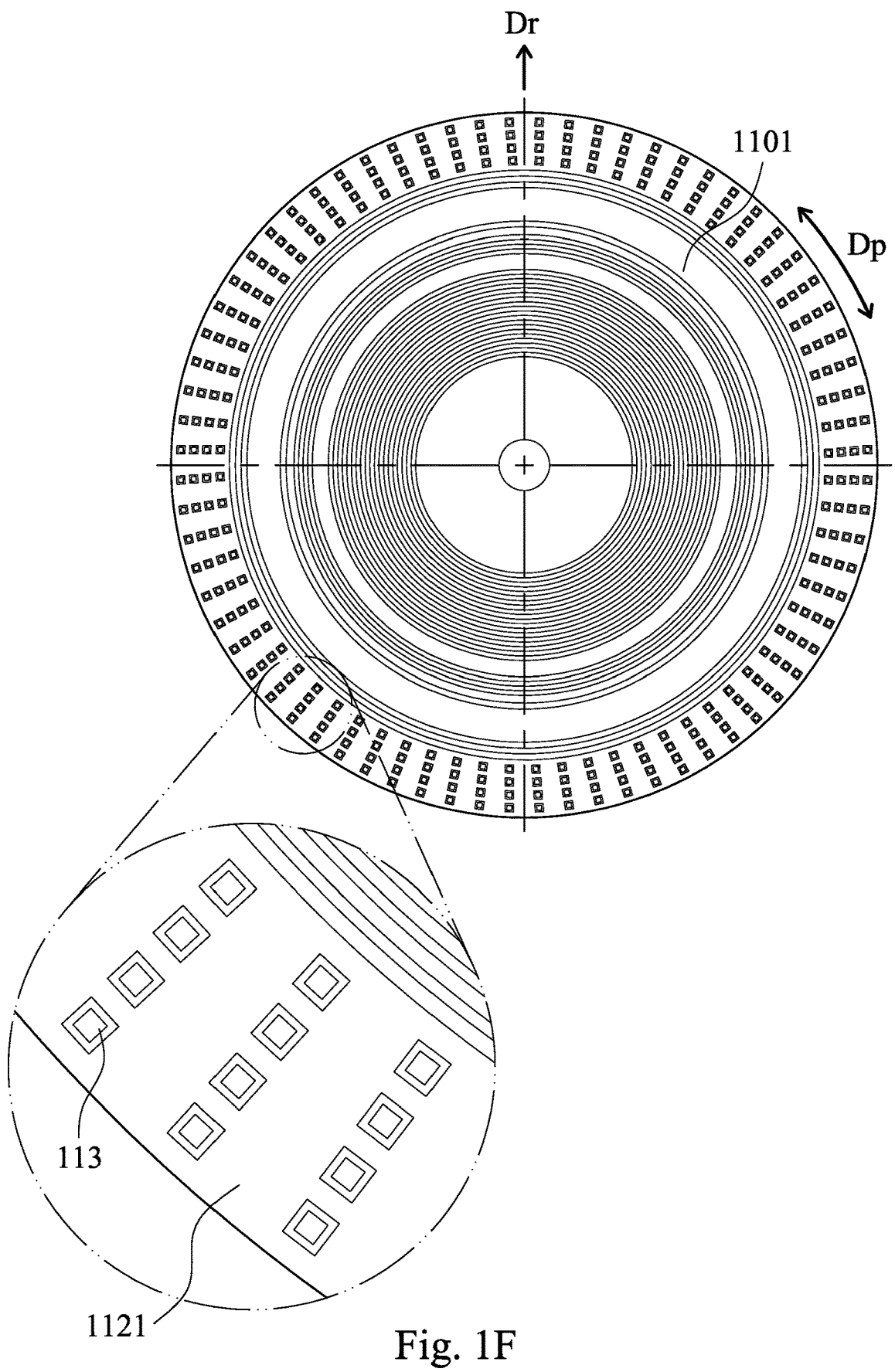
FIG. 1F is a schematic plan view of an object side of the plastic lens element according to the 1st embodiment in FIG. 1A.
Figure 1G:
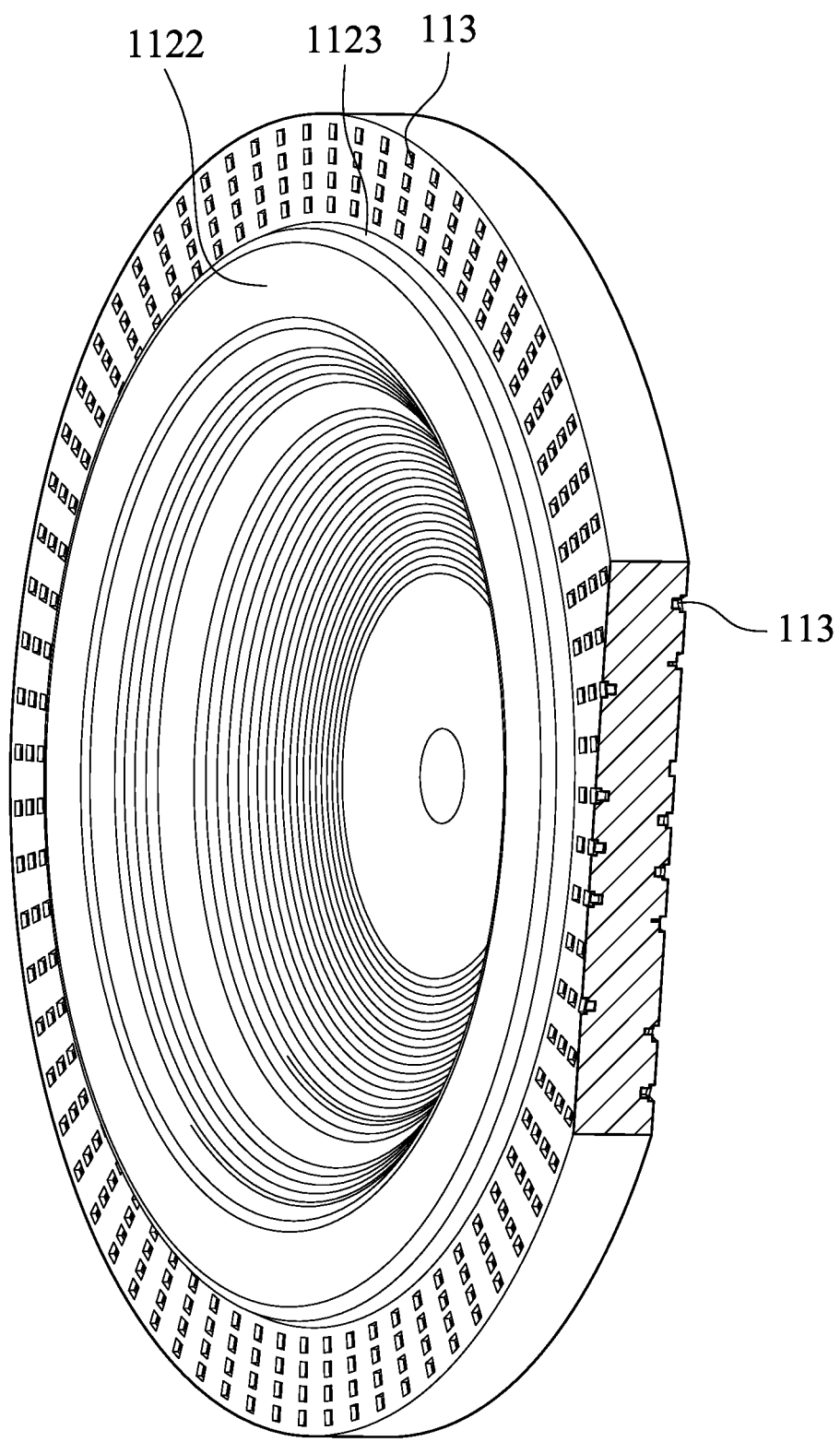
FIG. 1G is a partial sectional view of the plastic lens element of FIG. 1F.
Figure 1H:
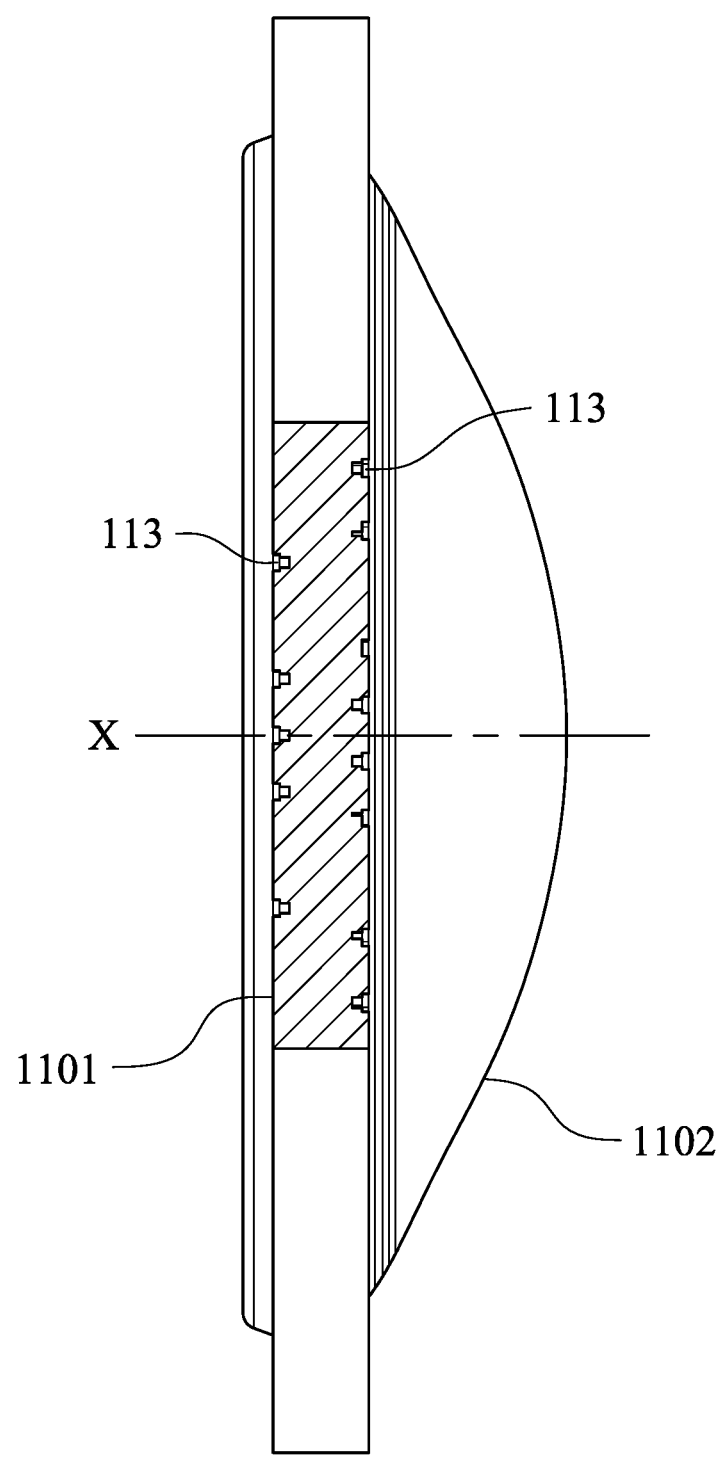
FIG. 1H is a side view of the plastic lens element of FIG. 1G.

FIG. 1F is a schematic plan view of an object side 1101 of the plastic lens element 110 according to the 1st embodiment in FIG. 1, FIG. 1G is a partial sectional view of the plastic lens element 110 of FIG. 1F, and FIG. 1H is a side view of the plastic lens element 110 of FIG. 1G. The outer peripheral portion 112 includes the grooves structures 113 on the object side 1101, and the groove structures 113 are arranged along the circumference direction Dp surrounding the optical axis X. At least three of the groove structures 113 are arranged along the radial direction Dr of the optical axis X. In detail, in the 1st embodiment, in the outer peripheral portion 112 on the object side 1101, four groove structures 113 are arranged along the radial direction Dr of the optical axis X. However, there is not that every four groove structures 113 thereof is arranged along the radial direction Dr of the optical axis X, the radial direction Dr is only used to illustrate, and the radial direction along the optical axis X of the plastic lens element 110 is not limited thereto. The outer peripheral portion 112 can further includes a plurality of separation surfaces 1121 on the object side 1101 respectively surrounding each of the groove structures 113.

As shown in FIG. 1H, the groove structures 113 located on the object side 1101 and the groove structures 113 located on the image side 1102 are alternately arranged along the circumference direction of the optical axis X and are not overlapped along the direction parallel to the optical axis X.

Please refer back to FIG. 1A, the outer peripheral portion 112 includes a contacting surface 1122 on the object side 1101. The contacting surface 112 is annular plane and perpendicular to the optical axis X, wherein the contacting surface 112 is connected to at least one optical element adjacent thereto. The groove structures 113 and the contacting surface 1122 are located on the same side (in the 1st embodiment, that is the object side 1101), there is an air gap 110a between the groove structures 113 and at least one optical element (in the 1st embodiment, that is the lens element 123) adjacent thereto, the groove structures 113 and the contacting surface 1122 located on the same side are not overlapped along the direction parallel to the optical axis X. Furthermore, the contacting surface 1122 can include a conical surface 1123. The conical surface 1123 contacts with and being concentric alignment to the lens element 123 adjacent thereto, and the contacting surface 1122 is connected to the light blocking sheet 132 adjacent thereto. The conical surface 1123 is disposed between the groove structures 113 and the optical effective portion 111 along a direction perpendicular to the optical axis X.

Please refer back to FIG. 1B, FIG. 1C, FIG. 1D and FIG. 1F, when a depth of the first structure 1131 is D1, a depth of the second structure 1132 is D2, a maximum outer diameter of the optical effective portion 111 on the object side 1101 and on the image side 1102 is φ1, a maximum outer diameter of the groove structures 113 on the object side 1101 and on the image side 1102 is φ2, a minimum inner diameter of the groove structures 113 on the object side 1101 and on the image side 1102 is φ3, a maximum width of the outer peripheral portion 112 parallel to the optical axis X is Wmax, a maximum depth of the groove structures 113 is d, a number of the groove structures 113 on the object side 1101 is N1, and a number of the groove structures 113 on the image side 1102 is N2, the conditions listed on Table 1 are respectively satisfied.

TABLE 1

| 1st Embodiment | | | |
|---|---|---|---|
| D1 (mm) | 0.02 | d (mm) | 0.050 |
| D2 (mm) | 0.03 | Wmax (mm) | 0.381 |
| D1/D2 | 0.667 | d/Wmax | 0.131 |
| φ1 (mm) | 3.420 | N1 | 288 |
| φ2 (mm) | 4.284 | N2 | 288 |
| φ3 (mm) | 3.704 | | |
| (φ2 − φ3)/φ1 | 0.17 | | |

2ND EMBODIMENT

Figure 2A:
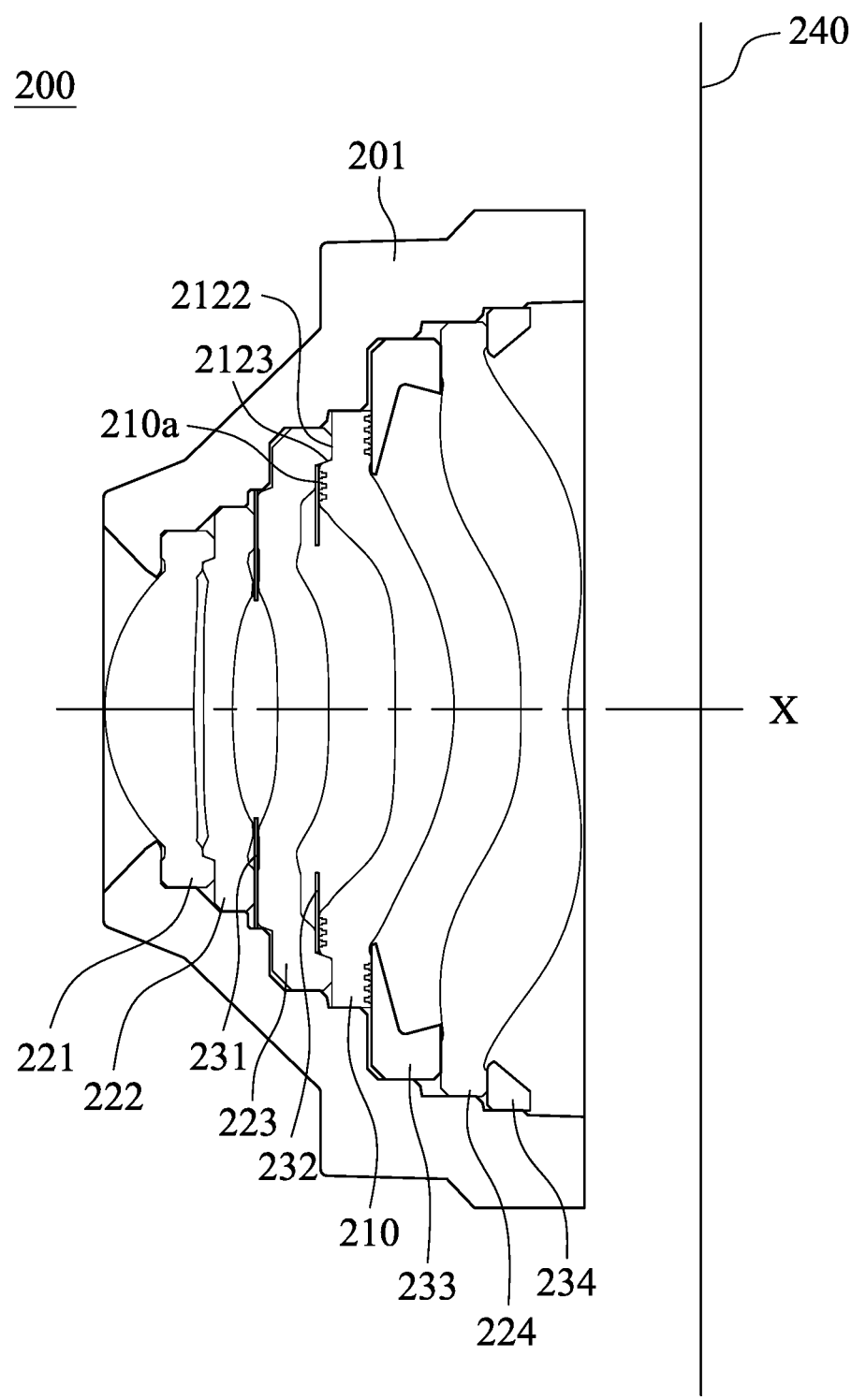
FIG. 2A is a schematic view of an imaging lens module according to the 2nd embodiment of the present disclosure.

FIG. 2A is a schematic view of an imaging lens module 200 according to the 2nd embodiment of the present disclosure. As shown in FIG. 2A, the imaging lens module 200 includes a barrel 201, a plastic lens element 210, a plurality of optical elements and an image surface 240, wherein the optical elements are respectively a lens element 221, a lens element 222, a light blocking sheet 231, a lens element 223, a light blocking sheet 232, a spacer 233, a lens element 224 and a fixing ring 234. All of the plastic lens element 210, the lens element 221, the lens element 222, the light blocking sheet 231, the lens element 223, the light blocking sheet 232, the spacer 233, the lens element 224 and the fixing ring 234 are disposed in the barrel 201, and the image surface 240 is disposed on an image side of the barrel 201.

Figure 2B:
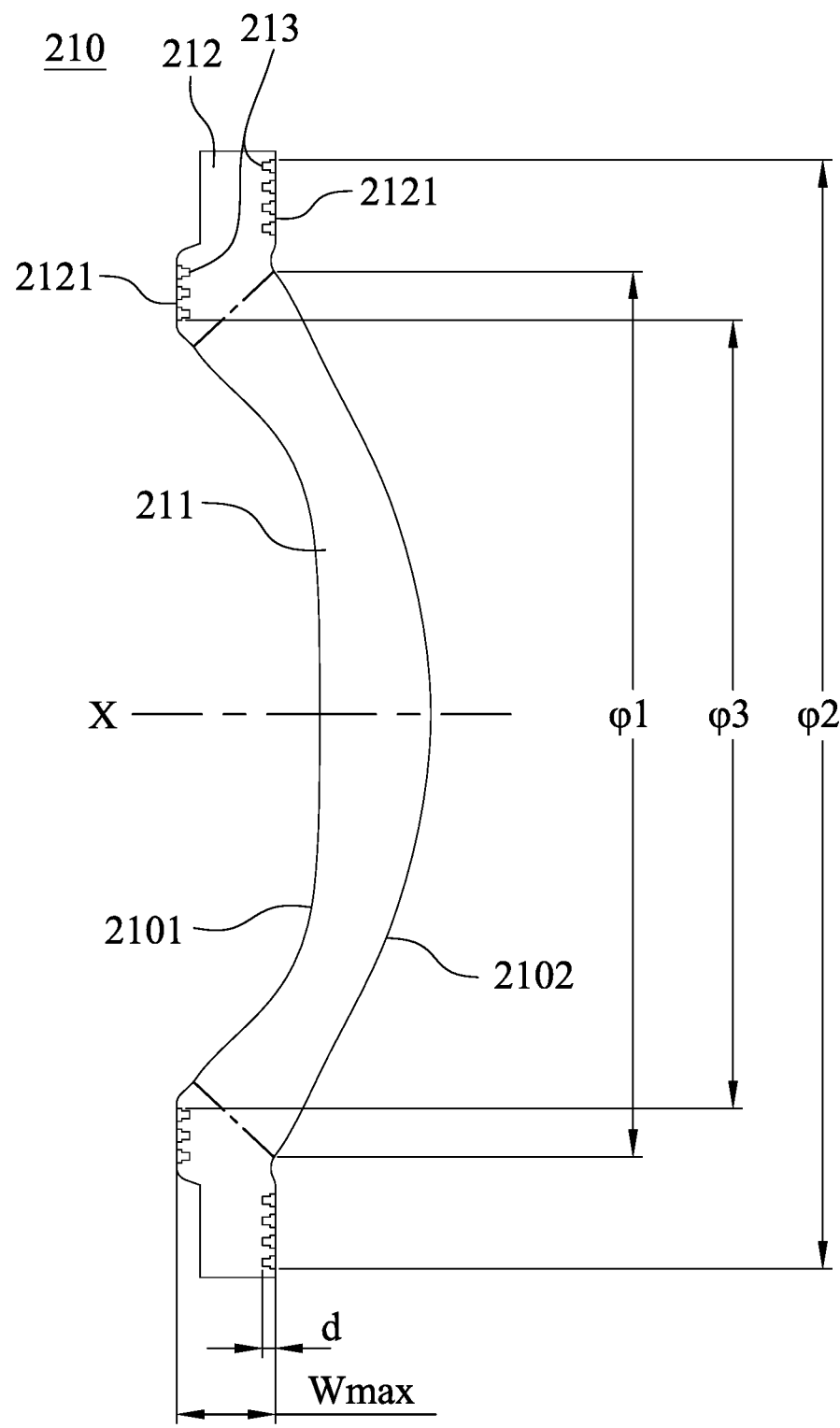
FIG. 2B is a schematic view of a plastic lens element according to the 2nd embodiment in FIG. 2A.

FIG. 2B is a schematic view of a plastic lens element 210 according to the 2nd embodiment in FIG. 2A. As shown in FIG. 2A and FIG. 2B, the plastic lens element 210 has an optical axis X, an object side 2101 and an image side 2102, and the plastic lens element 210 includes, in order from a center to a peripheral region thereof, an optical effective portion 211 and an outer peripheral portion 212. The optical axis X passes through the optical effective portion 211, and the outer peripheral portion 212 surrounds the optical effective portion 211. The outer peripheral portion 212 includes, on the object side 2101 and on the image side 2102, a plurality of groove structures 213, respectively. As shown in FIG. 1B, each of the groove structures 213 includes a first structure (not shown), a second structure (not shown) and a step surface (not shown), and the step surface is disposed between the first structure and the second structure. In the 2nd embodiment, the first structure, the second structure and the step surface are the same as the first structure 1131, the second structure 1132 and the step surface 1133 in the 1st embodiment, and it is not shown and described again herein. Each of the groove structures 213 includes an opening (reference number is omitted), and each of the groove structures 213 is recessed from the opening toward the plastic lens element 210 along a direction of the optical axis X. Please refer to following FIG. 2D and FIG. 2E, a shape of the opening can be rectangular-shaped but not limited thereto.

Figure 2C:
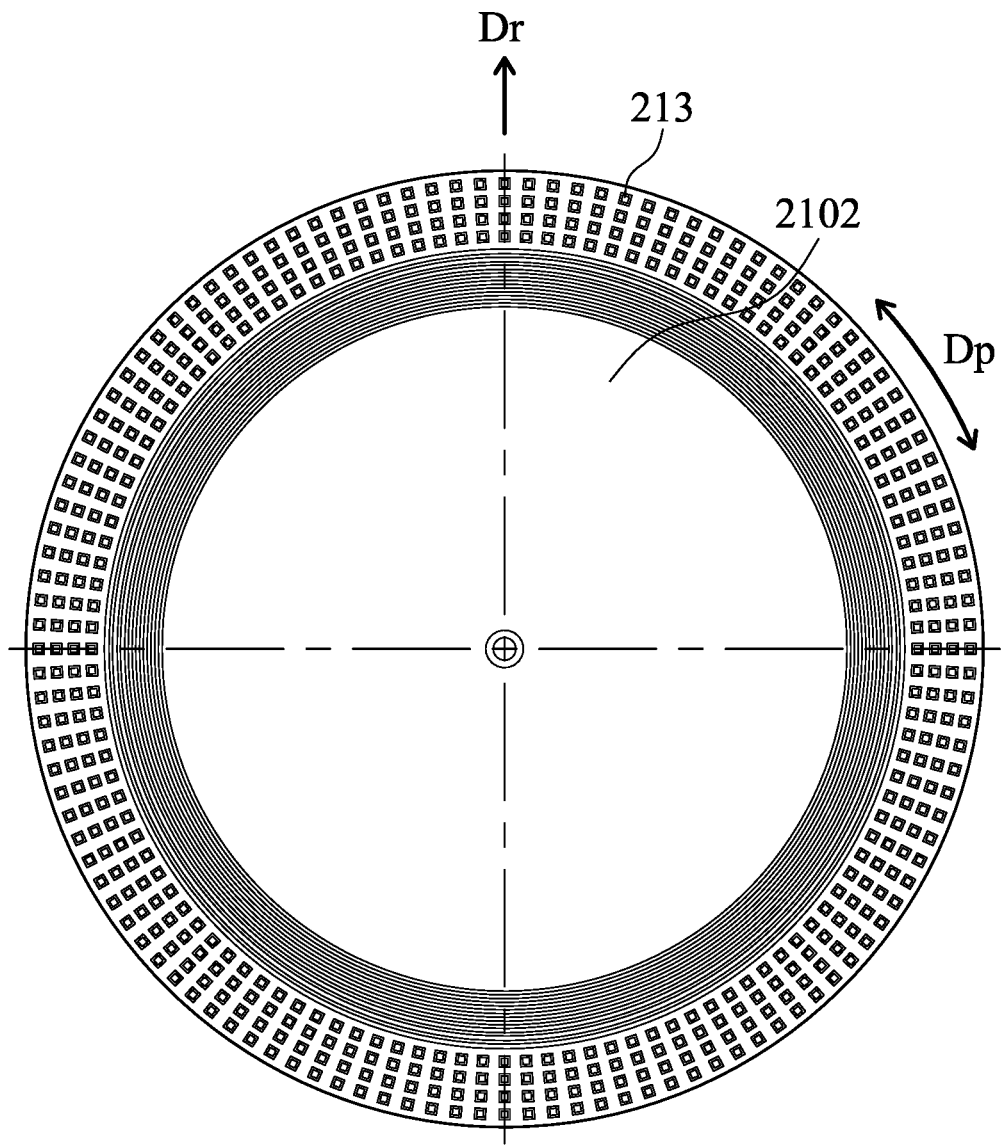
FIG. 2C is a schematic plan view of an image side of the plastic lens element according to the 2nd embodiment in FIG. 2A.
Figure 2D:
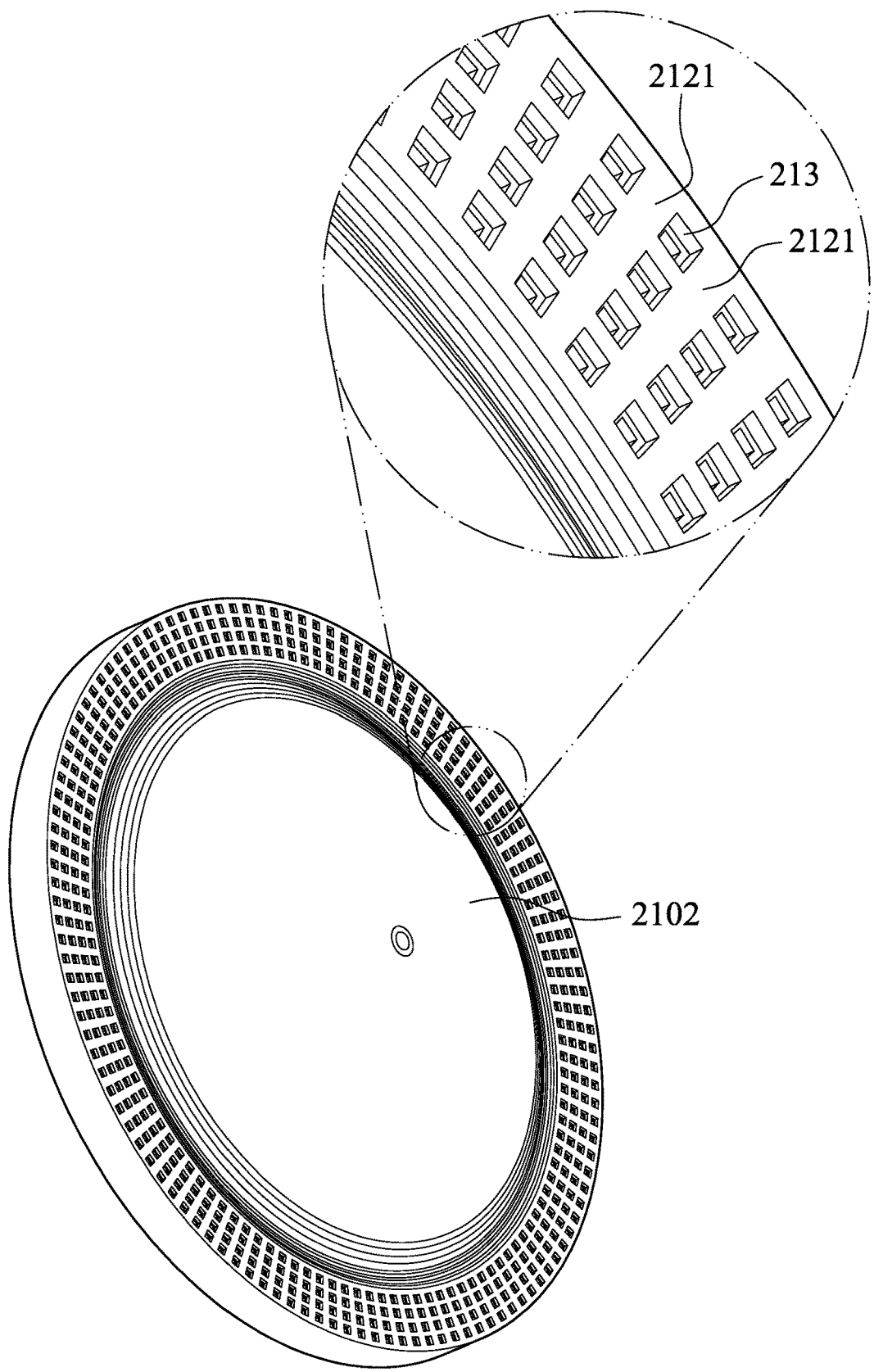
FIG. 2D is a three-dimensional view of the plastic lens element according to the 2nd embodiment in FIG. 2A.

FIG. 2C is a schematic plan view of the image side 2102 of the plastic lens element 210 according to the 2nd embodiment in FIG. 2A, and FIG. 2D is a three-dimensional view of the plastic lens element 210 according to the 2nd embodiment in FIG. 2A. The outer peripheral portion 212 includes the groove structures 213 on the image side 2102, and the groove structures 213 are arranged along a circumference direction Dp surrounding the optical axis X. At least three of the groove structures 213 are arranged along a radial direction Dr of the optical axis X. In detail, in the 2nd embodiment, on the image side 2102, four groove structures 213 of the outer peripheral portion 212 are arranged along the radial direction Dr of the optical axis X, wherein the radial direction Dr is only used to illustrate, and the radial direction along the optical axis X of the plastic lens element 210 is not limited thereto. The outer peripheral portion 212 further includes a plurality of separation surfaces 2121 on the image side 2102 respectively surrounding each of the groove structures 213.

Figure 2E:
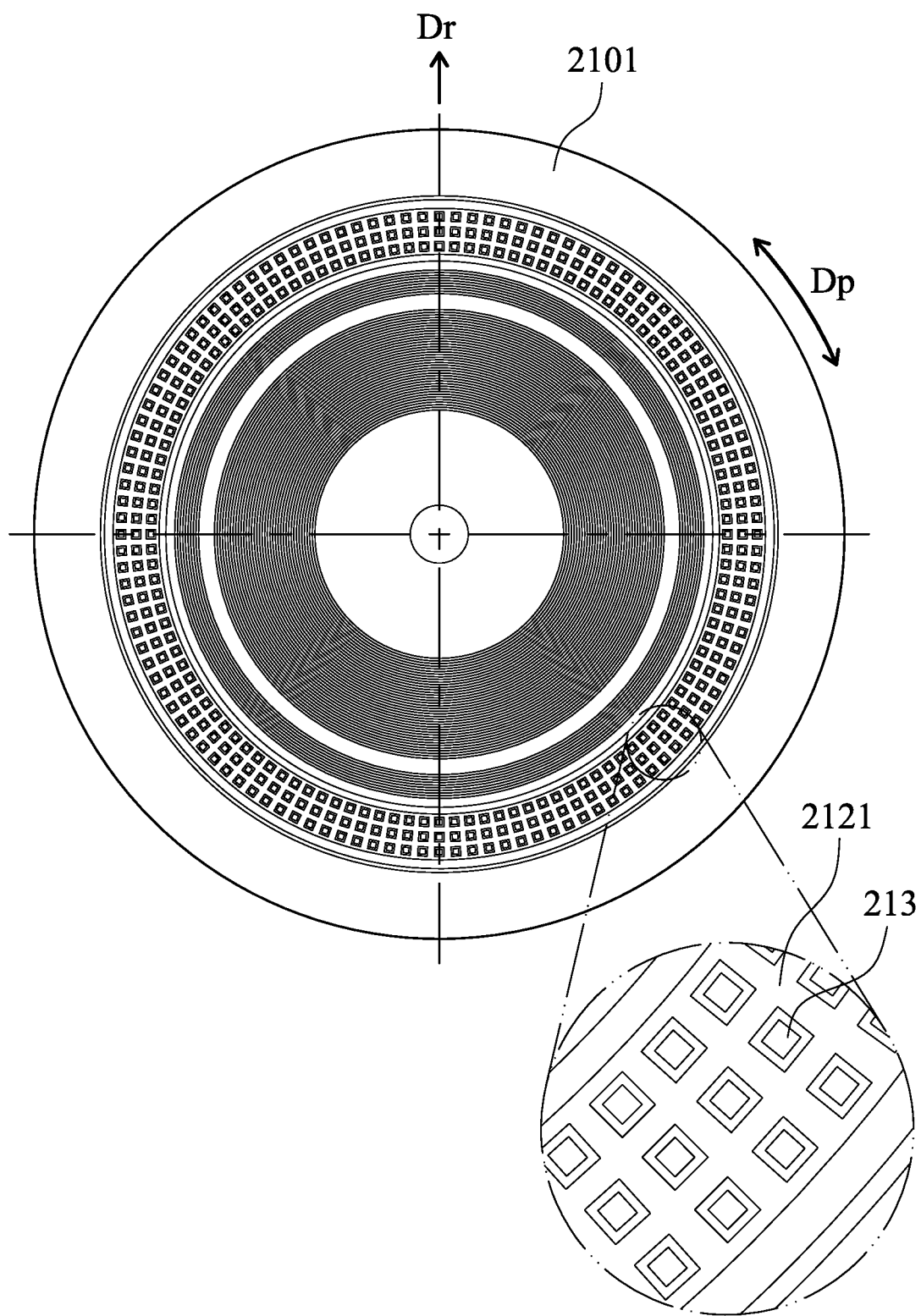
FIG. 2E is a schematic plan view of an object side of the plastic lens element according to the 2nd embodiment in FIG. 2A.

FIG. 2E is a schematic plan view of the object side 2101 of the plastic lens element 210 according to the 2nd embodiment in FIG. 2A. The outer peripheral portion 212 includes the groove structures 213 on the object side 2101, and the groove structures 213 are arranged along the circumference direction Dp of the optical axis X. At least three of the groove structures 213 are arranged along the radial direction Dr of the optical axis X. In detail, in the 2nd embodiment, in the outer peripheral portion 212, three groove structures 213 on the object side 2101 are arranged along the radial direction Dr of the optical axis X, but there is not that every three groove structures 213 thereof is arranged along the radial direction Dr of the optical axis X. Furthermore, the radial direction Dr is only used to illustrate, and the radial direction along the optical axis X of the plastic lens element 210 is not limited thereto. The outer peripheral portion 212 can further include a plurality of separation surfaces 2121 on the object side 2101 respectively surrounding each of the groove structures 213.

As shown in FIG. 2B, the groove structures 213 located on one of the object side 2101 and the image side 2102 and the optical effective portion 211 located on the other of the object side 2101 and the image side 2102 are overlapped on a direction parallel to the optical axis X. In specific, in the 2nd embodiment, the groove structures 213 on the object side 2101 and the optical effective portion 211 on the image side 2102 are overlapped on the direction parallel to the optical axis X.

Please refer back to FIG. 2A, the outer peripheral portion 212 includes a contacting surface 2122 on the object side 2101. The contacting surface 2122 is an annular plane and perpendicular to the optical axis X, wherein the contacting surface 2122 is connected with at least one optical element adjacent thereto. The groove structures 213 and the contacting surface 2122 are located on the same side (in the 2nd embodiment, that is the object side 2101), there is an air gap 210a between the groove structures 213 and at least one optical element (in the 2nd embodiment, that is the lens element 223) adjacent thereto, the groove structures 213 and the contacting surface 2122 located on the same side are not overlapped along the direction parallel to the optical axis X. Furthermore, the contacting surface 2122 can include a conical surface 2123. The conical surface 2123 contacts with and being concentric alignment to the lens element 223 adjacent thereto, and the contacting surface 2122 is contacted to the light blocking sheet 232 adjacent thereto. The conical surface 2123 is farther from the optical axis X than the groove structures 213 on the same side.

Please refer back to FIG. 2B, FIG. 2C and FIG. 2E, when a maximum outer diameter of the optical effective portion 211 on the object side 2101 and on the image side 2102 is φ1, a maximum outer diameter of the groove structures 213 on the object side 2101 and on the image side 2102 is φ2, a minimum inner diameter of the groove structures 213 on the object side 2101 and on the image side 2102 is φ3, a maximum width of the outer peripheral portion 212 parallel to the optical axis X is Wmax, a maximum depth of the groove structures 213 is d, a number of the groove structures 213 on the object side 2101 is N1, and a number of the groove structures 213 on the image side 2102 is N2, the conditions listed on Table 2 are respectively satisfied.

TABLE 2

| 2nd Embodiment | | | |
|---|---|---|---|
| φ1 (mm) | 3.420 | d (mm) | 0.050 |
| φ2 (mm) | 4.284 | Wmax (mm) | 0.381 |
| φ3 (mm) | 3.044 | d/Wmax | 0.131 |
| (φ2 − φ3)/φ1 | 0.363 | N1 | 360 |
| | | N2 | 480 |

3RD EMBODIMENT

Figure 3A:
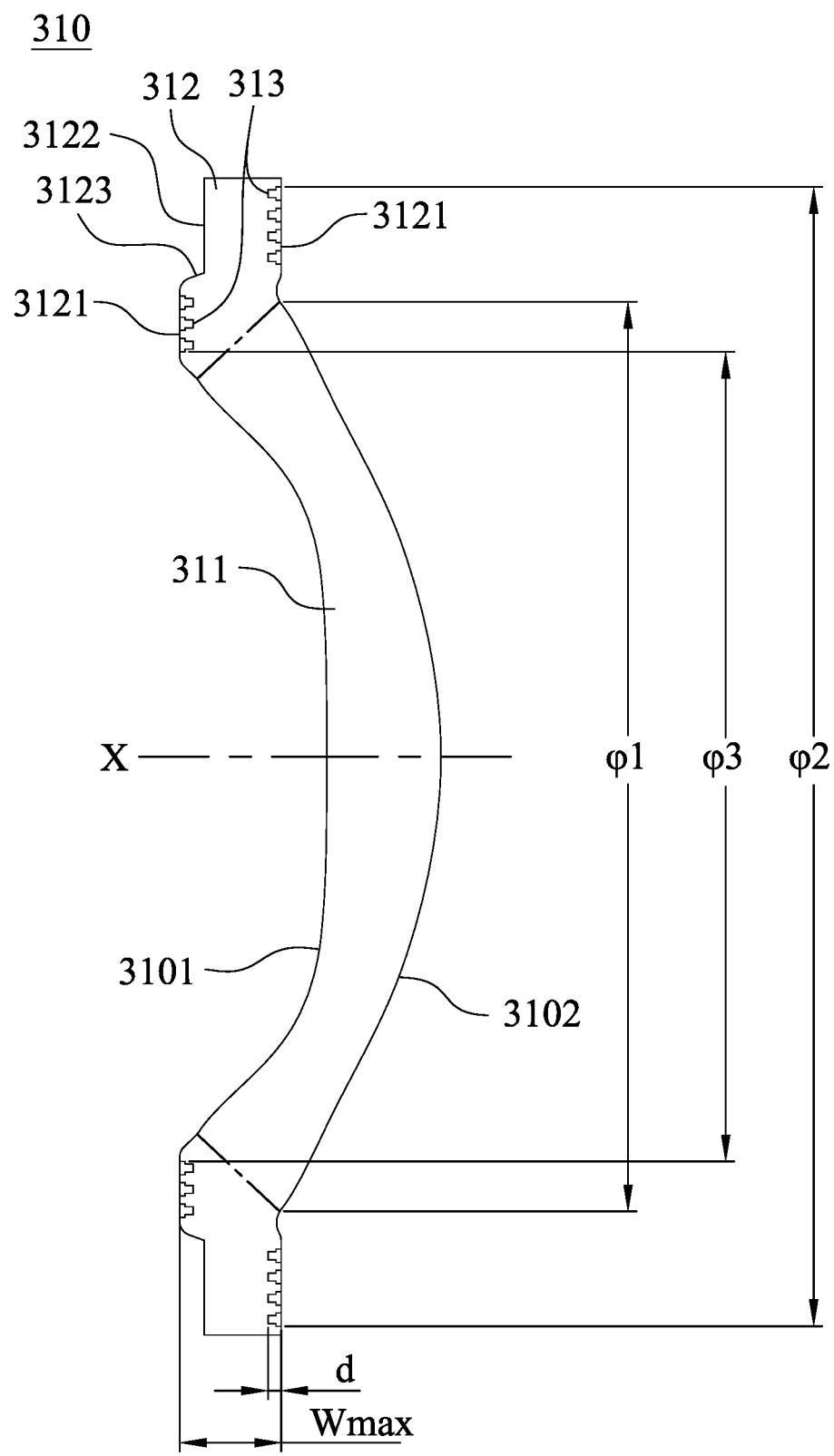
FIG. 3A is a schematic view of a plastic lens element of an imaging lens module according to the 3rd embodiment of the present disclosure.

FIG. 3A is a schematic view of a plastic lens element 310 of an imaging lens module according to the 3rd embodiment of the present disclosure. In the 3rd embodiment, the imaging lens module can be the same as the aforementioned 1st embodiment and 2nd embodiment and includes a barrel (not shown), a plastic lens element 310, a plurality of optical elements (not shown) and an image surface (not shown), and it is not described herein again.

As shown in FIG. 3A, the plastic lens element 310 has an optical axis X, an object side 3101 and an image side 3102, and the plastic lens element 310 includes, in order from a center to a peripheral region thereof, an optical effective portion 311 and an outer peripheral portion 312. The optical axis X passes through the optical effective portion 311, and the outer peripheral portion 312 surrounds the optical effective portion 311. The outer peripheral portion 312 includes, on the object side 3101 and on the image side 3102, a plurality of groove structures 313, respectively. Each of the groove structures 313 includes a first structure (not shown), a second structure (not shown) and a step surface (not shown), and the step surface is disposed between the first structure and the second structure. In the 3rd embodiment, the first structure, the second structure and the step surface are the same as the first structure 1131, the second structure 1132 and the step surface 1133 of the 1st embodiment, and it is not shown and described herein again. Each of the groove structures 313 includes an opening (reference number is omitted), and each of the groove structures 313 is recessed from the opening toward the plastic lens element 310 along a direction of the optical axis X. Please refer to the following FIG. 3B and FIG. 3D, a shape of the opening can be rectangular-shaped but is not limited thereto.

Figure 3B:
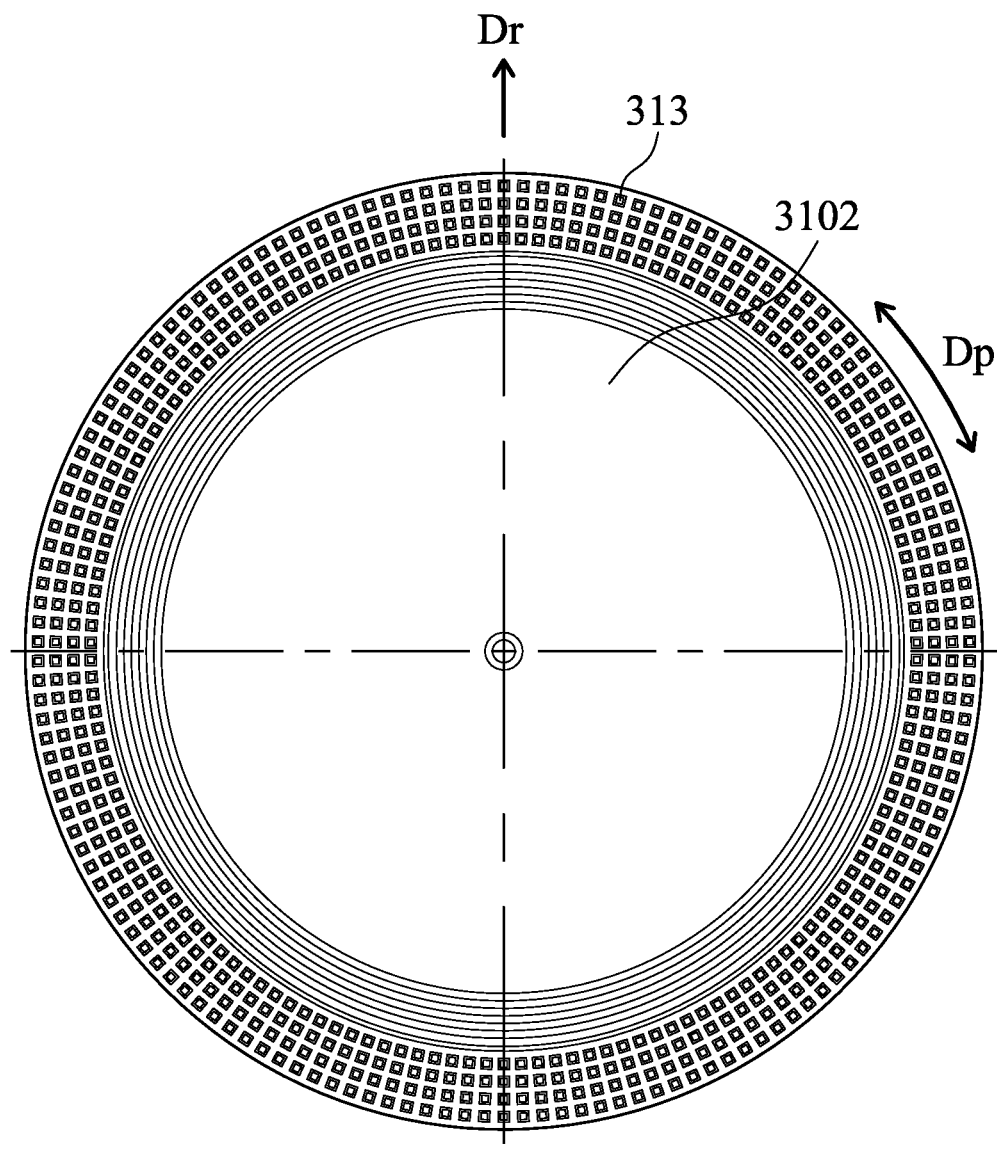
FIG. 3B is a schematic plan view of an image side of the plastic lens element according to the 3rd embodiment in FIG. 3A.
Figure 3C:
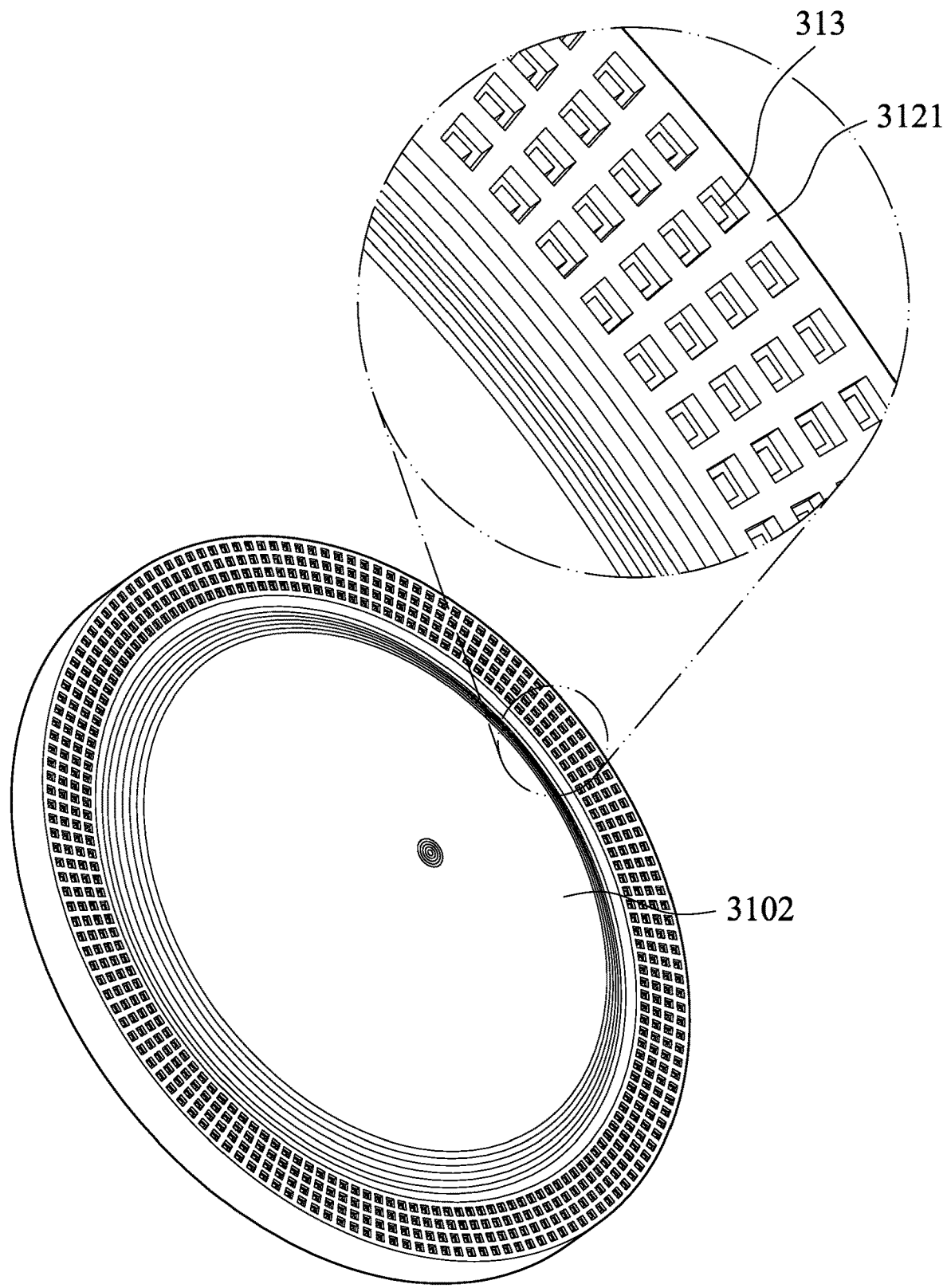
FIG. 3C is a three-dimensional view of the plastic lens element according to the 3rd embodiment in FIG. 3A.

FIG. 3B is a schematic plan view of the image side 3102 of the plastic lens element 310 according to the 3rd embodiment in FIG. 3A, and FIG. 3C is a three-dimensional view of the plastic lens element 310 according to the 3rd embodiment in FIG. 3A. The outer peripheral portion 312 includes the groove structures 313 on the image side 3102, and the groove structures 313 are arranged along a circumference direction Dp surrounding the optical axis X. At least three of the groove structures 313 are arranged along a radial direction Dr of the optical axis X. In detail, in the 3rd embodiment, on the image side 3102, four groove structures 313 of the outer peripheral portion 312 are arranged along the radial direction Dr of the optical axis X, wherein the radial direction Dr is only used to illustrate, and the radial direction along the optical axis X of the plastic lens element 310 is not limited thereto. The outer peripheral portion 312 further includes a plurality of separation surfaces 3121 on the image side 3102 respectively surrounding each of the groove structures 313.

Figure 3D:
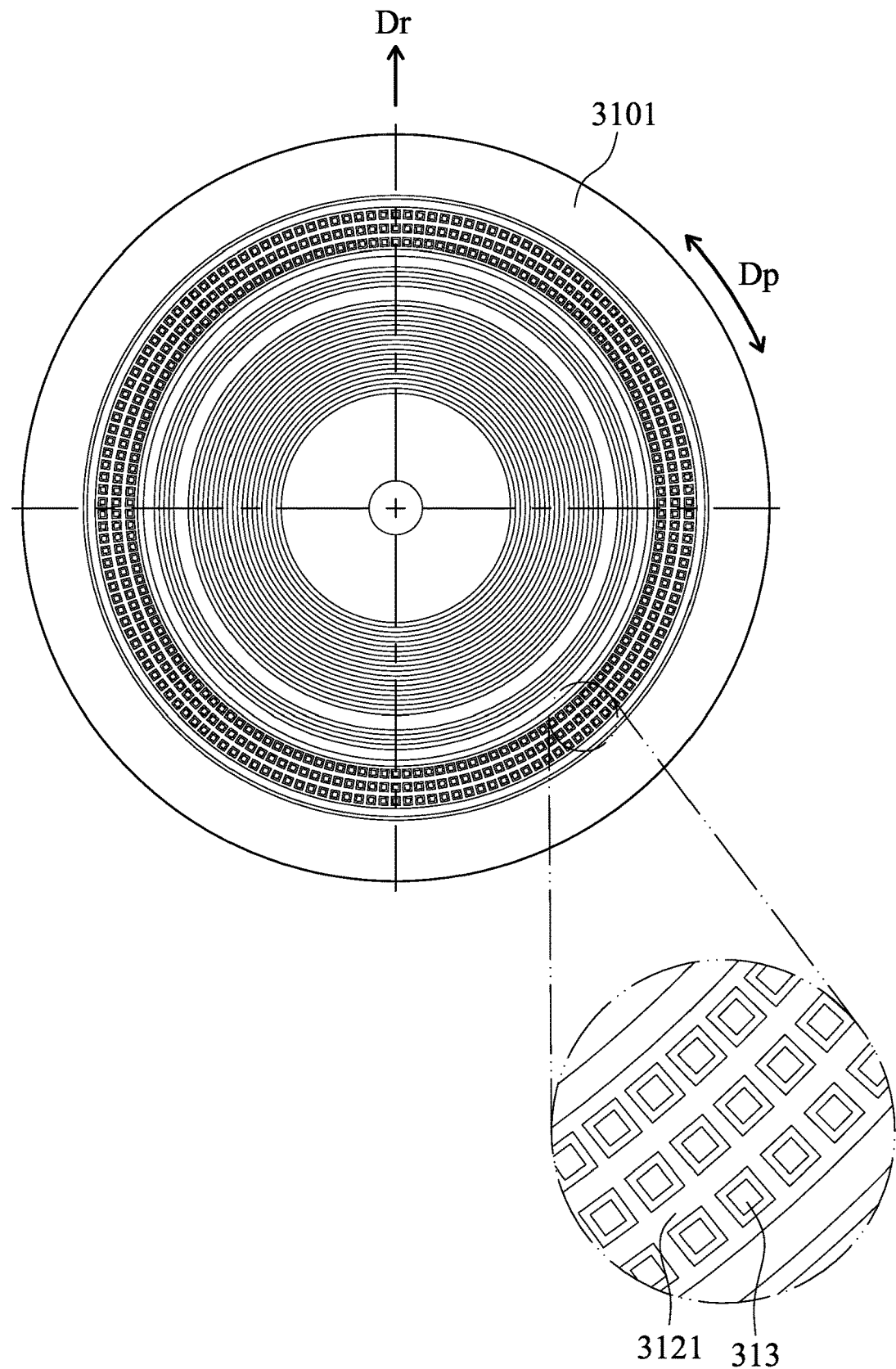
FIG. 3D is a schematic plan view of an object side of the plastic lens element according to the 3rd embodiment in FIG. 3A.

FIG. 3D is a schematic plan view of an object side 3101 of the plastic lens element 310 according to the 3rd embodiment in FIG. 3A. The outer peripheral portion 312 includes the groove structures 313 on the object side 3101, and the groove structures 313 are arranged along the circumference direction Dp surrounding the optical axis X. At least three of the groove structures 313 are arranged along the radial direction Dr of the optical axis X. In detail, in the 3rd embodiment, in the outer peripheral portion 312, three groove structures 313 on the object side 3101 are arranged along the radial direction Dr of the optical axis X, but there is not that every three groove structures 313 thereof is arranged along the radial direction Dr of the optical axis X. Furthermore, the radial direction Dr is only used to illustrate, and the radial direction along the optical axis X of the plastic lens element 310 is not limited thereto. The outer peripheral portion 312 further includes a plurality of separation surfaces 3121 on the object side 3101 respectively surrounding each of the groove structures 313.

As shown in FIG. 3A, the groove structures 313 located on one of the object side 3101 and the image side 3102 and the optical effective portion 311 located on the other of the object side 3101 and the image side 3102 are overlapped on a direction parallel to the optical axis X. In specific, in the 3rd embodiment, the groove structures 313 on the object side 3101 and the optical effective portion 311 on the image side 3102 are overlapped on the direction parallel to the optical axis X.

Please refer back to FIG. 3A, the outer peripheral portion 312 includes a contacting surface 3122 on the object side 3101. The contacting surface 3122 is an annular plane and perpendicular to the optical axis X, wherein the contacting surface 3122 is connected with at least one optical element adjacent thereto. The groove structures 313 and the contacting surface 3122 are located on the same side (in the 3rd embodiment, that is the object side 3101), there is an air gap (not shown in figures) between the groove structures 313 and at least one optical element adjacent thereto, the groove structures 313 and the contacting surface 3122 located on the same side are not overlapped along the direction parallel to the optical axis X. Furthermore, the contacting surface 3122 can include a conical surface 3123. The conical surface 3123 contacts with and being concentric alignment the lens element (not shown) adjacent thereto. The conical surface 3123 is farther from the optical axis X than the groove structures 313 on the same side.

Please refer back to FIG. 3A, FIG. 3B and FIG. 3D, when a maximum outer diameter of the optical effective portion 311 on the object side 3101 and on the image side 3102 is $\varphi 1$, a maximum outer diameter of the groove structures 313 on the object side 3101 and on the image side 3102 is $\varphi 2$, a minimum inner diameter of the groove structures 313 on the object side 3101 and on the image side 3102 is $\varphi 3$, a maximum width of the outer peripheral portion 312 parallel to the optical axis X is Wmax, a maximum depth of the groove structures 313 is d, a number of the groove structures 313 on the object side 3101 is N1, and a number of the groove structures 313 on the image side 3102 is N2, the conditions listed on Table 3 are respectively satisfied.

TABLE 3

3rd Embodiment

| $\varphi 1$ (mm) | 3.420 | d (mm) | 0.050 |
|---|---|---|---|
| $\varphi 2$ (mm) | 4.284 | Wmax (mm) | 0.381 |
| $\varphi 3$ (mm) | 3.044 | d/Wmax | 0.131 |
| $(\varphi 2 - \varphi 3)/\varphi 1$ | 0.363 | N1 | 450 |
| | | N2 | 600 |

4TH EMBODIMENT

Figure 4A:
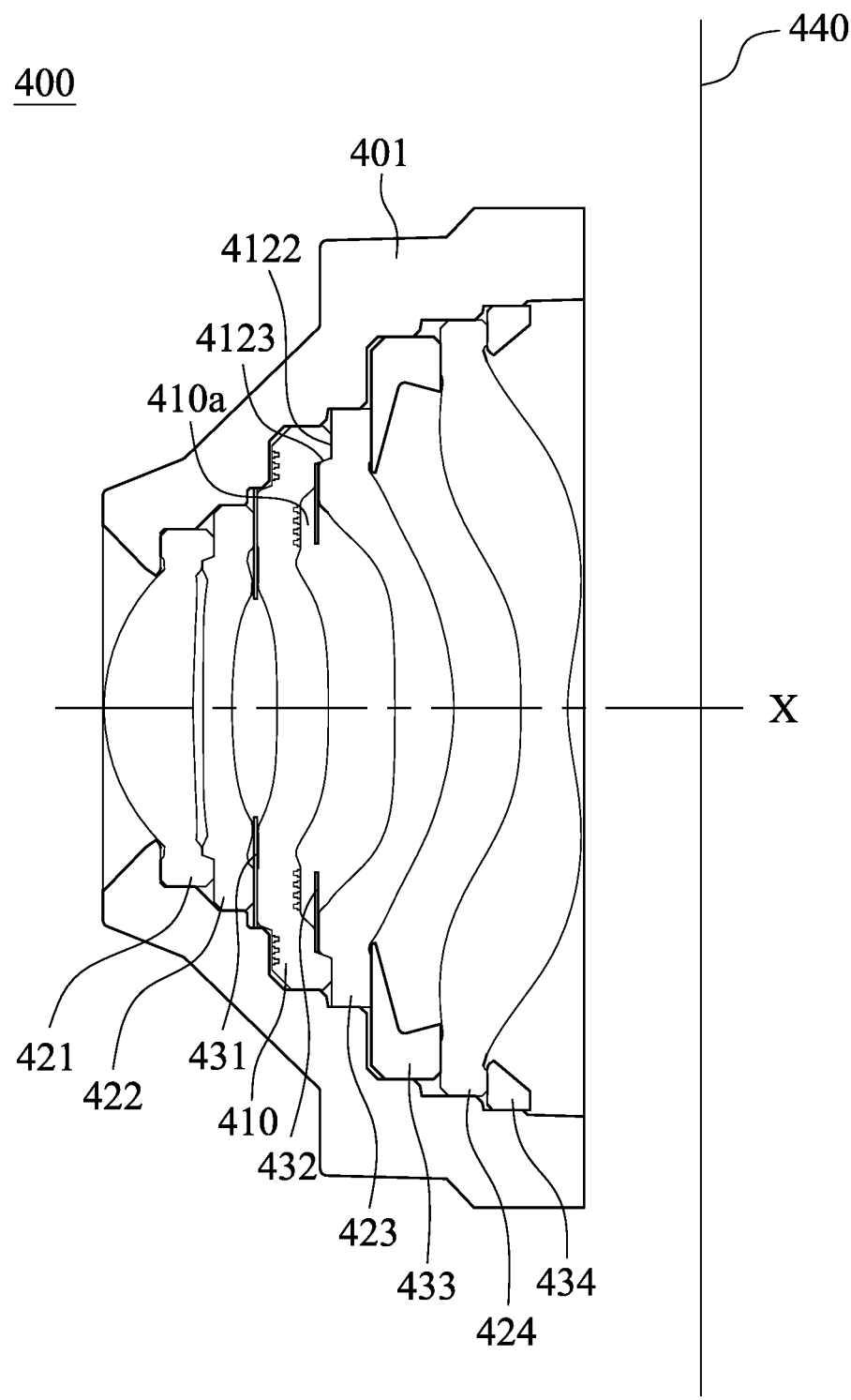
FIG. 4A is a schematic view of an imaging lens module according to the 4th embodiment of the present disclosure.

FIG. 4A is a schematic view of an imaging lens module 400 according to the 4th embodiment of the present disclosure. As shown in FIG. 4A, the imaging lens module 400 includes a barrel 401, a plastic lens element 410, a plurality of optical elements and an image surface 440, wherein the optical elements are respectively a lens element 421, a lens element 422, soma light blocking sheet 431, a light blocking sheet 432, a lens element 423, a spacer 433, a lens element 424 and a fixing ring 434. All of the plastic lens element 410, the lens element 421, the lens element 422, the light blocking sheet 431, the light blocking sheet 432, the lens element 423, the spacer 433, the lens element 424 and the fixing ring 434 are disposed in the barrel 401, and the image surface 440 is disposed on an image side of the barrel 401.

Figure 4B:
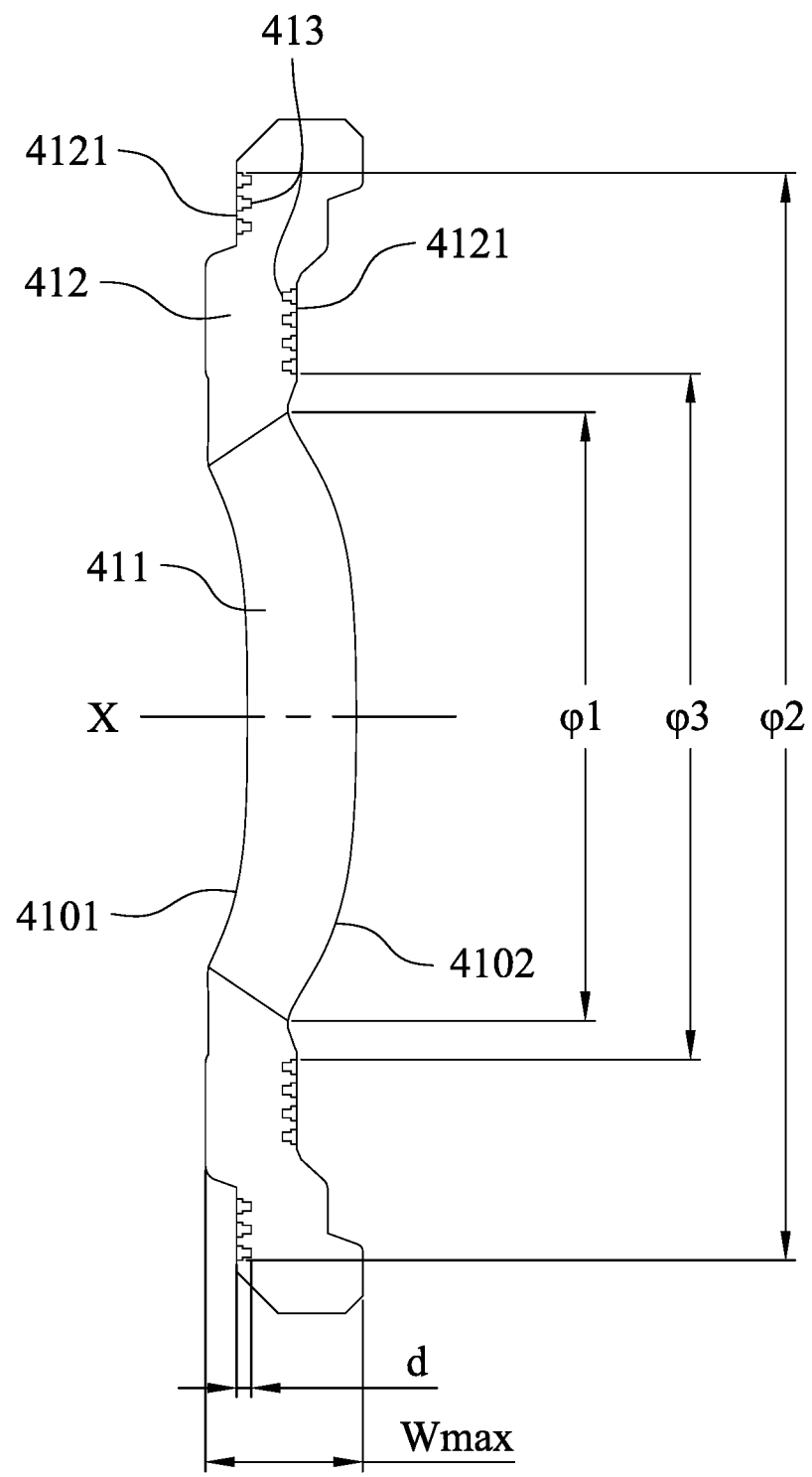
FIG. 4B is a schematic view of a plastic lens element according to the 4th embodiment in FIG. 4A.

FIG. 4B is a schematic view of the plastic lens element 410 according to the 4th embodiment in FIG. 4A. As shown in FIG. 4A and FIG. 4B, the plastic lens element 410 has an optical axis X, an object side 4101 and an image side 4102, in order from a center thereof to a peripheral region thereof, and the plastic lens element 410 includes, in order from a center to a peripheral region thereof, an optical effective portion 411 and an outer peripheral portion 412. The optical axis X passes through the optical effective portion 411, and the outer peripheral portion 412 surrounds the optical effective portion 411. The outer peripheral portion 412 includes, on the object side 4101 and on the image side 4102, a plurality of groove structures 413, respectively. As shown in FIG. 4B, each of the groove structures 413 includes a first structure (not shown), a second structure (not shown) and a step surface (not shown), and the step surface is disposed between the first structure and the second structure. In the 4th embodiment, the first structure, the second structure and the step surface are the same as the first structure 1131, the second structure 1132 and the step surface 1133 of the 1st embodiment, and it is not shown and described herein again. Each of the groove structures 413 includes an opening (reference number is omitted), and each of the groove structures 413 is recessed from the opening toward the plastic lens element 410 along a direction of the optical axis X. Please refer to the following FIG. 4C and FIG. 4D, a shape of the opening can be rectangular-shaped but not limited thereto.

Figure 4C:
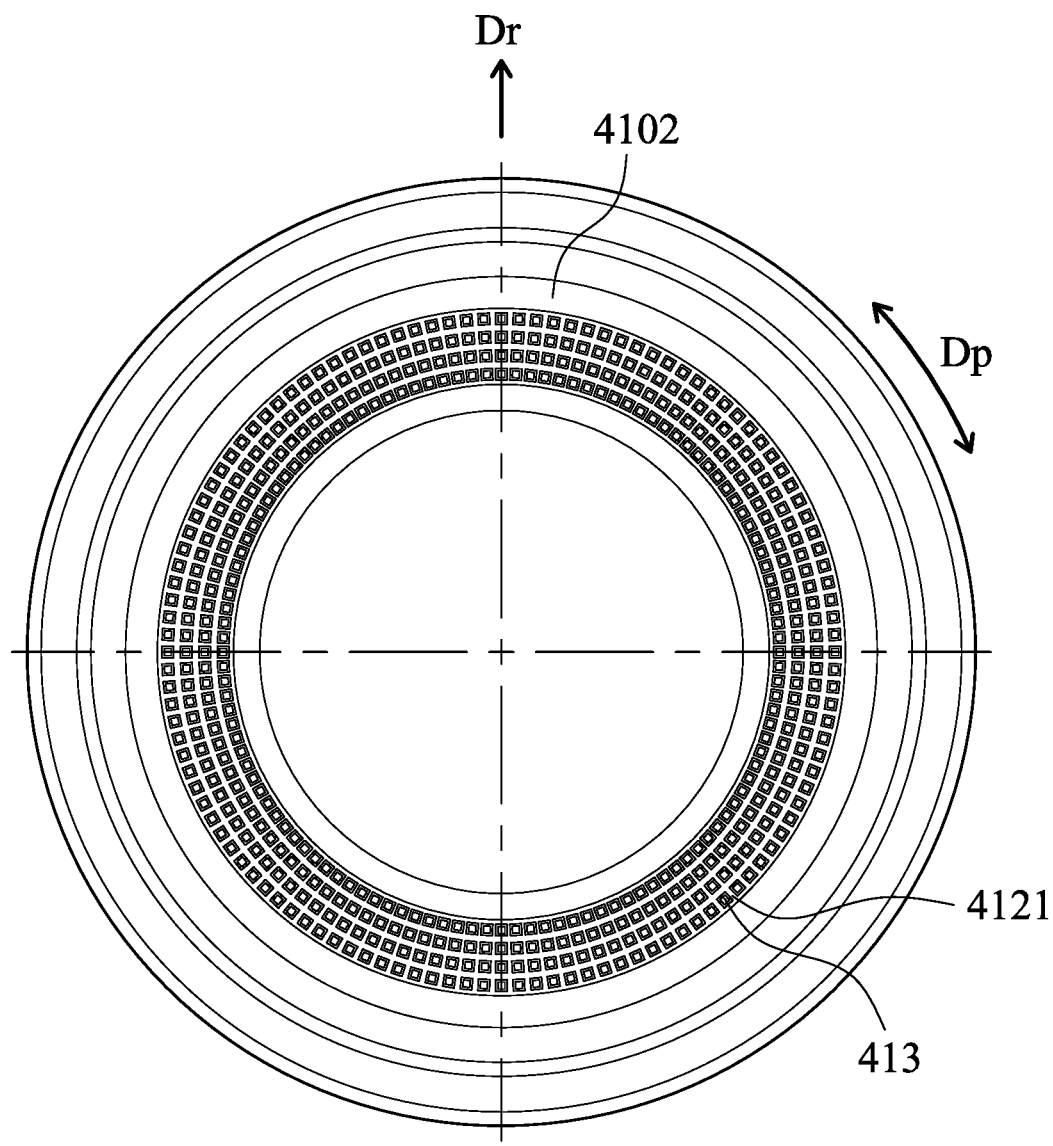
FIG. 4C is a schematic plan view of an image side of the plastic lens element according to the 4th embodiment in FIG. 4A.

FIG. 4C is a schematic plan view of the image side 4102 of the plastic lens element 410 according to the 4th embodiment in FIG. 4A. The outer peripheral portion 412 includes the groove structures 413 on the image side 4102, and the groove structures 413 are arranged along a circumference direction Dp surrounding the optical axis X. At least three of the groove structures 413 are arranged along a radial direction Dr of the optical axis X. In detail, in the 4th embodiment, on the image side 4102, four groove structures 413 of the outer peripheral portion 412 are arranged along the radial direction Dr of the optical axis X, wherein the radial direction Dr is only used to illustrate, and the radial direction along the optical axis X of the plastic lens element 410 is not limited thereto. The outer peripheral portion 412 further includes a plurality of separation surfaces 4121 on the image side 4102 respectively surrounding each of the groove structures 413.

Figure 4D:
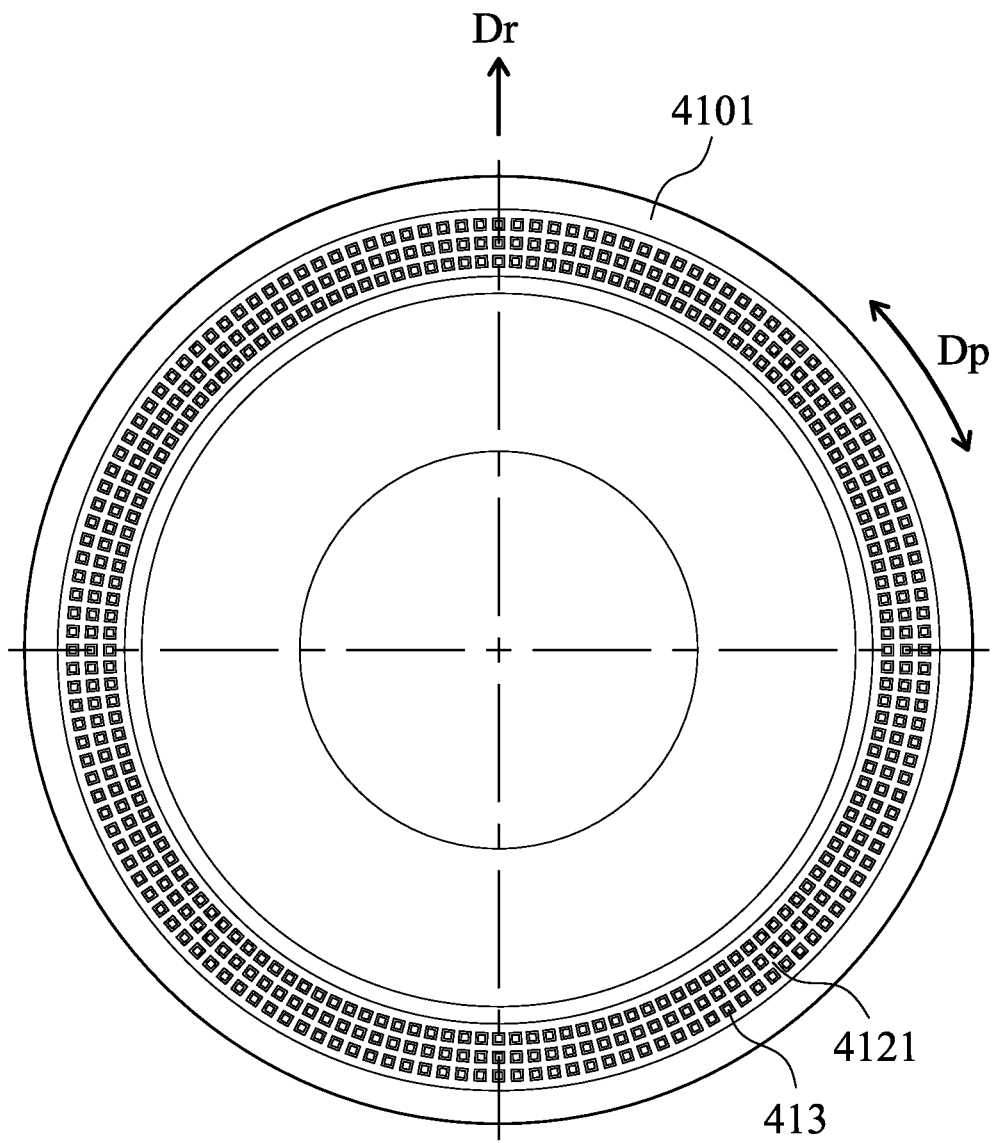
FIG. 4D is a schematic plan view of an object side of the plastic lens element according to the 4th embodiment in FIG. 4A.

FIG. 4D is a schematic plan view of the object side 4101 of the plastic lens element 410 according to the 4th embodiment in FIG. 4A. The outer peripheral portion 412 includes the groove structures 413 on the object side 4101, and the groove structures 413 are arranged along the circumference direction Dp of the optical axis X. At least three of the groove structures 413 are arranged along the radial direction Dr of the optical axis X. In detail, in the 4th embodiment, in the outer peripheral portion 412, three groove structures 413 on the object side 4101 are arranged along the radial direction Dr of the optical axis X, but there is not that every three groove structures 413 thereof is arranged along the radial direction Dr of the optical axis X. Furthermore, the radial direction Dr is only used to illustrate, and the radial direction along the optical axis X of the plastic lens element 410 is not limited thereto. The outer peripheral portion 412 can further include a plurality of separation surfaces 4121 on the object side 4101 respectively surrounding each of the groove structures 413.

Please refer back to FIG. 4A, the outer peripheral portion 412 includes a contacting surface 4122 on the image side 4102. The contacting surface 4122 is an annular plane and perpendicular to the optical axis X, wherein the contacting surface 4122 is connected with at least one optical element adjacent thereto. The groove structures 413 and the contacting surface 4122 are located on the same side (in the 4th embodiment, that is the image side 4102), there is an air gap 410a between the groove structures 413 and at least one optical element (in the 4th embodiment, that is the light blocking sheet 432) adjacent thereto, the groove structures 413 and the contacting surface 4122 located on the same side are not overlapped along the direction parallel to the optical axis X. Furthermore, the contacting surface 4122 can include a conical surface 4123. The conical surface contacts with and being concentric alignment to the lens element 423 adjacent thereto, and the contacting surface 4122 is connected to the lens element 423 and the light blocking sheet 432 adjacent thereto. The conical surface 4123 is farther from the optical axis X than the groove structures 413 on the same side.

Please refer back to FIG. 4B, FIG. 4C and FIG. 4D, when a maximum outer diameter of the optical effective portion 411 on the object side 4101 and on the image side 4102 is φ1, a maximum outer diameter of the groove structures 413 on the object side 4101 and on the image side 4102 is φ2, a minimum inner diameter of the groove structures 413 on the object side 4101 and on the image side 4102 is φ3, a maximum width of the outer peripheral portion 412 parallel to the optical axis X is Wmax, a maximum depth of the groove structures 413 is d, a number of the groove structures 413 on the object side 4101 is N1, and a number of the groove structures 413 on the image side 4102 is N2, the conditions listed on Table 4 are respectively satisfied.

TABLE 4

4th Embodiment

| φ1 (mm) | 2.090 | d (mm) | 0.050 |
|---|---|---|---|
| φ2 (mm) | 3.734 | Wmax (mm) | 0.540 |
| φ3 (mm) | 2.356 | d/Wmax | 0.093 |
| (φ2 − φ3)/φ1 | 0.659 | N1 | 360 |
| | | N2 | 480 |

5TH EMBODIMENT

Figure 5A:
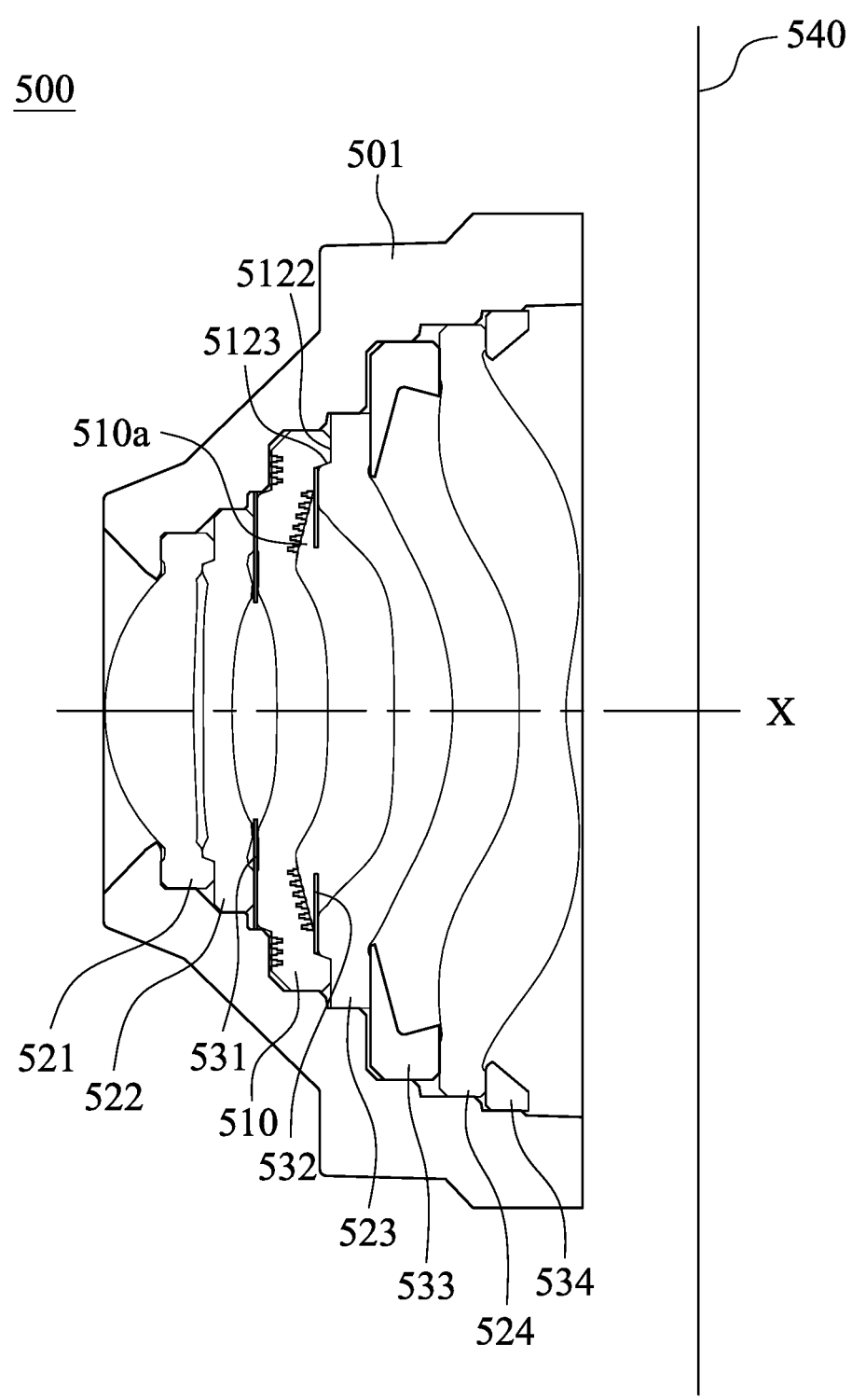
FIG. 5A is a schematic view of an imaging lens module according to the 5th embodiment of the present disclosure.

FIG. 5A is a schematic view of an imaging lens module 500 according to the 5th embodiment of the present disclosure. As shown in FIG. 5A, the imaging lens module 500 includes a barrel 501, a plastic lens element 501, a plurality of optical elements and an image surface 540, wherein the optical elements are respectively a lens element 521, a lens element 522, a light blocking sheet 531, a light blocking sheet 532, a lens element 523, a spacer 533, a lens element 524 and a fixing ring 534. All of the plastic lens element 510, the lens element 521, the lens element 522, the light blocking sheet 531, the light blocking sheet 532, the lens element 523, the spacer 533, the lens element 524 and the fixing ring 534 are disposed in the barrel 501, and the image surface 540 is disposed on an image side of the barrel 501.

Figure 5B:
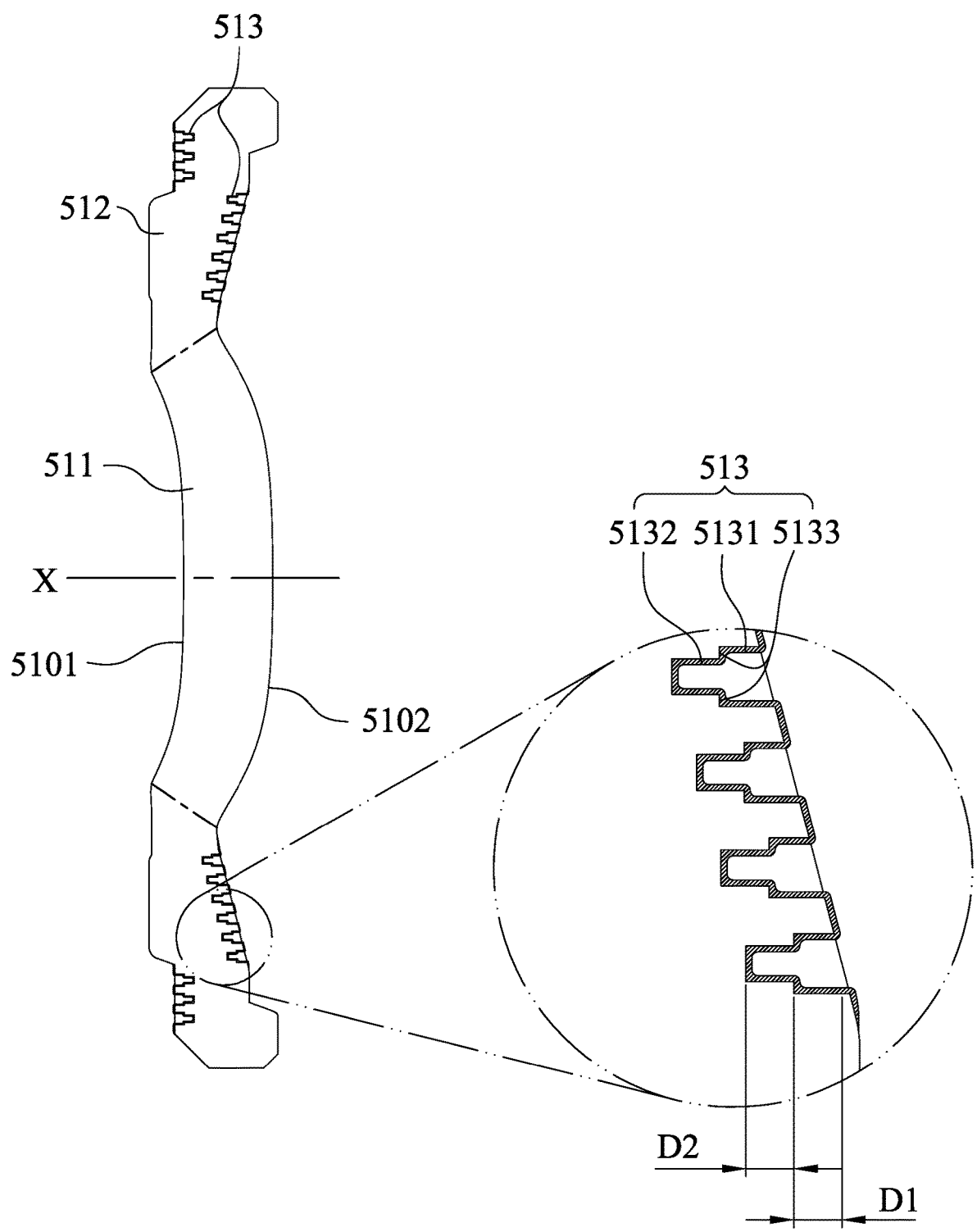
FIG. 5B is a schematic view of a plastic lens element according to the 5th embodiment in FIG. 5A.
Figure 5C:
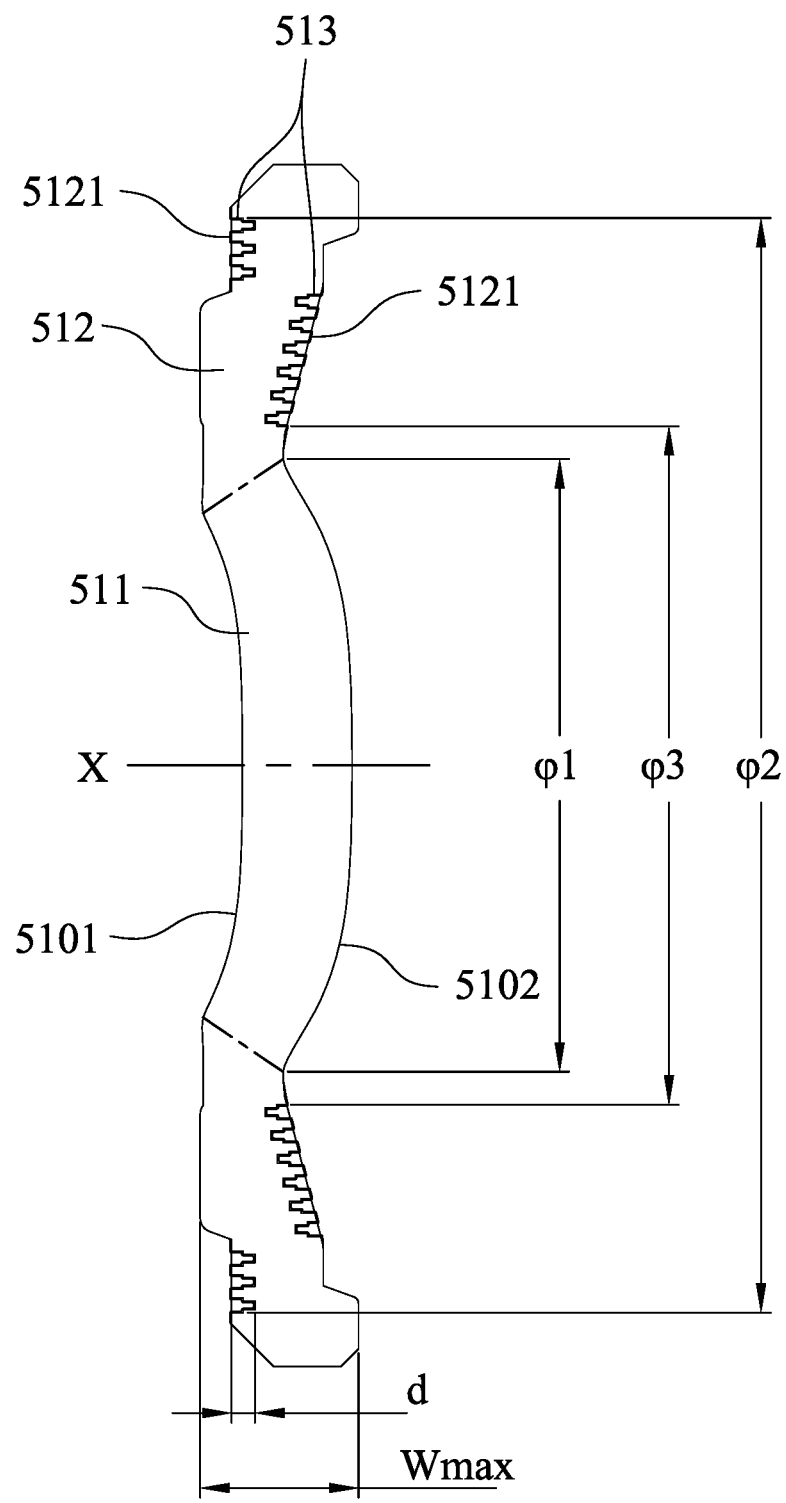
FIG. 5C is a schematic view of the parameters according to the 5th embodiment in FIG. 5A.

FIG. 5B is a schematic view of the plastic lens element 510 according to the 5th embodiment in FIG. 5A, and FIG. 5C is a schematic view of the parameters according to the 5th embodiment in FIG. 5A. As shown in FIG. 5A, FIG. 5B and FIG. 5C, the plastic lens element 510 has an optical axis X, an object side 5101 and an image side 5102, and the plastic lens element 510 includes, in order from a center to a peripheral region thereof, an optical effective portion 511 and an outer peripheral portion 512. The optical axis X passes through the optical effective portion 511, and the outer peripheral portion 512 surrounds the optical effective portion 511. The outer peripheral portion 512 includes, on the object side 5101 and on the image side 5102, a plurality of groove structures 513, respectively. Each of the groove structures 513 includes a first structure 5131, a second structure 5132 and a step surface 5133, and the step surface 5133 is disposed between the first structure 5131 and the second structure 5132. Each of the groove structures 513 includes an opening (reference number is omitted), and each of the groove structures 513 is recessed from the opening toward the plastic lens element 510 along a direction of the optical axis X. In other words, each of the groove structures 513 is recessed from the first structure 5131 toward the second structure 5132 along a direction of the optical axis X. Please refer to the following FIG. 5E, a shape of the opening can be rectangular-shaped but is not limited thereto. Furthermore, the groove structures 513 includes a light absorbing layer (reference number is omitted) disposed on each of the first structure 5131, the second structure 5132 and the step surface 5133.

Figure 5D:
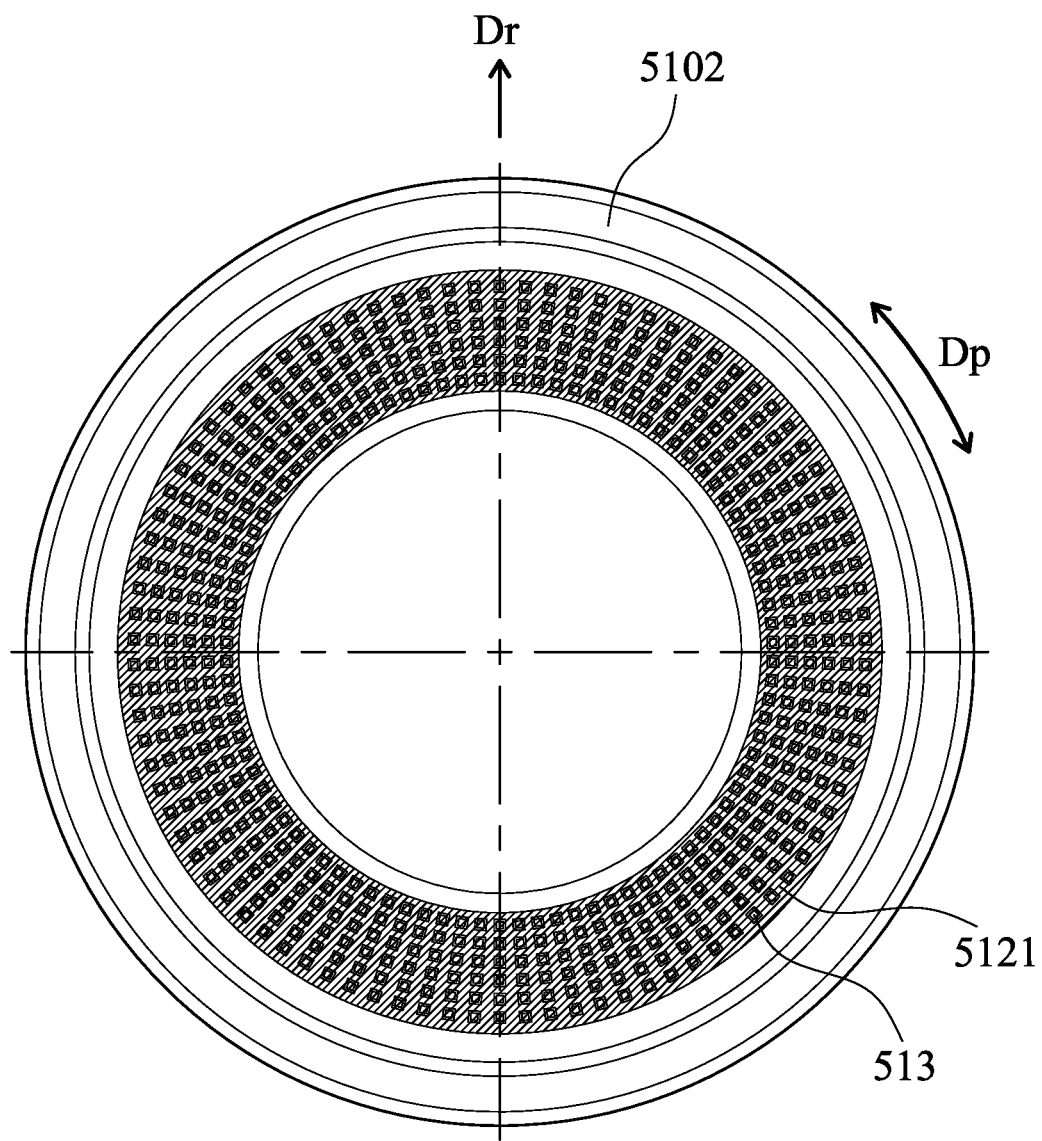
FIG. 5D is a schematic plan view of an image side of the plastic lens element according to the 5th embodiment in FIG. 5A.

FIG. 5D is a schematic plan view of the image side 5102 of the plastic lens element 510 according to the 5th embodiment in FIG. 5A. The outer peripheral portion 512 includes the groove structures 513 on the image side 5102, and the groove structures 513 are arranged along a circumference direction Dp surrounding the optical axis X. At least three of the groove structures 513 are arranged along a radial direction Dr of the optical axis X. In detail, in the 5th embodiment, on the image side 5102, five groove structures 513 of the outer peripheral portion 512 are arranged along the radial direction Dr of the optical axis X, wherein the radial direction Dr is only used to illustrate, and the radial direction along the optical axis X of the plastic lens element 510 is not limited thereto. The outer peripheral portion 512 further includes a plurality of separation surfaces 5121 on the image side 5102 respectively surrounding each of the groove structures 513.

Figure 5E:
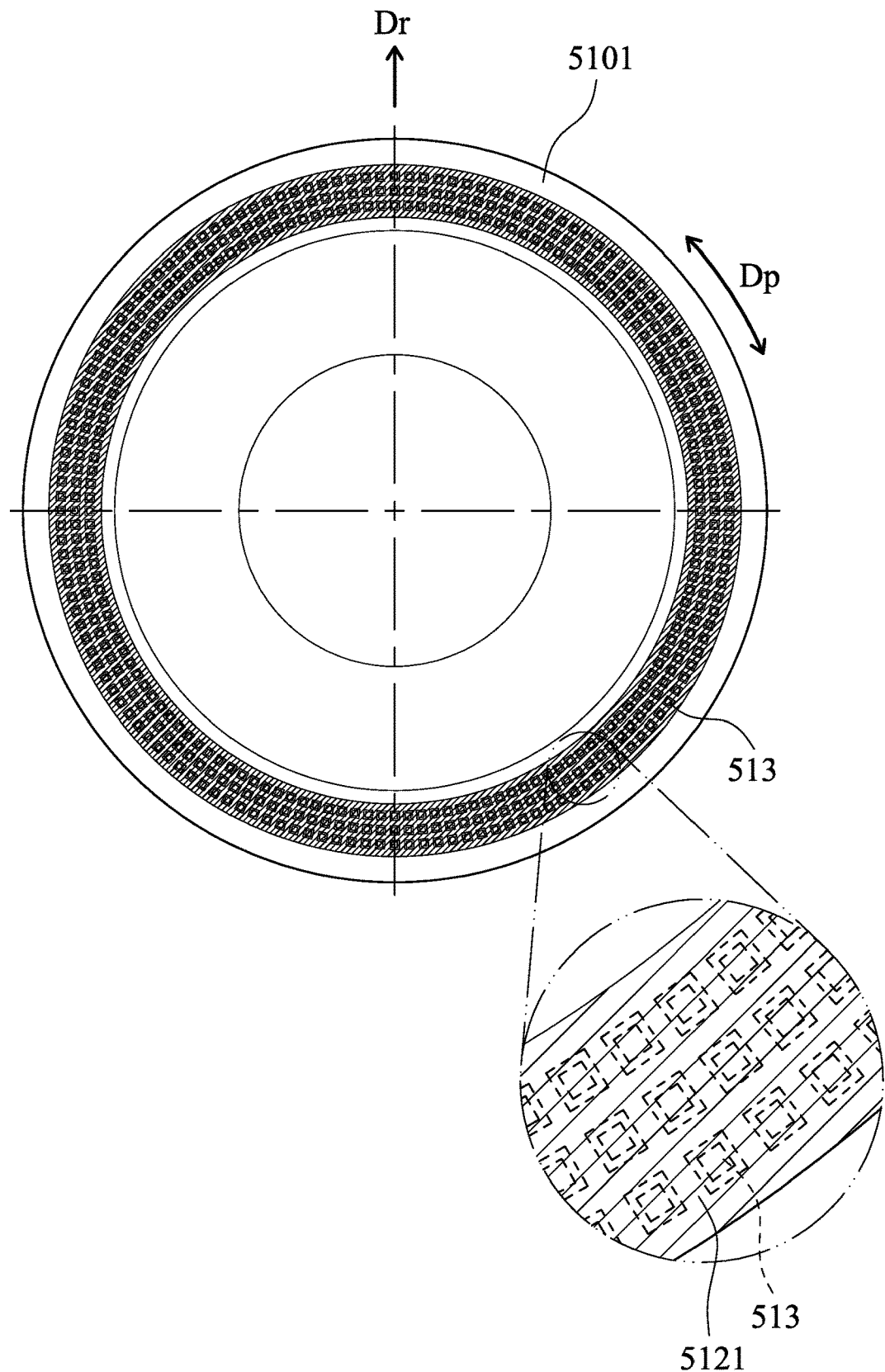
FIG. 5E is a schematic plan view of an object side of the plastic lens element according to the 5th embodiment in FIG. 5A.

FIG. 5E is a schematic plan view of the object side 5101 of the plastic lens element 510 according to the 5th embodiment in FIG. 5A. The outer peripheral portion 512 includes the groove structures 513 on the object side 5101, and the groove structures 513 are arranged along the circumference direction Dp of the optical axis X. At least three of the groove structures 513 are arranged along the radial direction Dr of the optical axis X. In detail, in the 5th embodiment, in the outer peripheral portion 512, three groove structures 513 on the object side 5101 are arranged along the radial direction Dr of the optical axis X, but there is not that every three groove structures 513 thereof is arranged along the radial direction Dr of the optical axis X. Furthermore, the radial direction Dr is only used to illustrate, and the radial direction along the optical axis X of the plastic lens element 510 is not limited thereto. The outer peripheral portion 512 further includes a plurality of separation surfaces 5121 on the object side 5101 respectively surrounding each of the groove structures 513.

Please refer back to FIG. 5A, the outer peripheral portion 512 includes a contacting surface 5122 on the image side 5102. The contacting surface 5122 is an annular plane and perpendicular to the optical axis X, wherein the contacting surface 5122 is connected with at least one optical element adjacent thereto. The groove structures 513 and the contacting surface 5122 are located on the same side (in the 5th embodiment, that is the image side 5102), there is an air gap 510a between the groove structures 513 and at least one optical element (in the 5th embodiment, that is the light blocking sheet 532) adjacent thereto, the groove structures 513 and the contacting surface 5122 located on the same side are not overlapped along the direction parallel to the optical axis X. Furthermore, the contacting surface 5122 can include a conical surface 5123. The conical surface 5123 contacts with and being concentric alignment to the lens element 523 adjacent thereto, and the contacting surface 5122 is also connected with the lens element 523 adjacent thereto.

Please refer back to FIG. 5B, FIG. 5C, FIG. 5D and FIG. 5E, when a depth of the first structure 5131 is D1, a depth of the second structure 5132 is D2, a maximum outer diameter of the optical effective portion 511 on the object side 5101 and on the image side 5102 is $\varphi1$, a maximum outer diameter of the groove structures 513 on the object side 5101 and on the image side 5102 is $\varphi2$, a minimum inner diameter of the groove structures 513 on the object side 5101 and on the image side 5102 is $\varphi3$, a maximum width of the outer peripheral portion 512 parallel to the optical axis X is Wmax, a maximum depth of the groove structures 513 is d, a number of the groove structures 513 on the object side 5101 is N1, and a number of the groove structures 513 on the image side 5102 is N2, the conditions listed on Table 5 are respectively satisfied.

TABLE 5

5th Embodiment

| D1 (mm) | 0.04 | d (mm) | 0.080 |
| D2 (mm) | 0.04 | Wmax (mm) | 0.540 |
| D1/D2 | 1 | d/Wmax | 0.148 |
| $\varphi1$ (mm) | 2.090 | N1 | 360 |
| $\varphi2$ (mm) | 3.734 | N2 | 540 |
| $\varphi3$ (mm) | 2.314 | | |
| $(\varphi2 - \varphi3)/\varphi1$ | 0.679 | | |

6TH EMBODIMENT

Figure 6A:
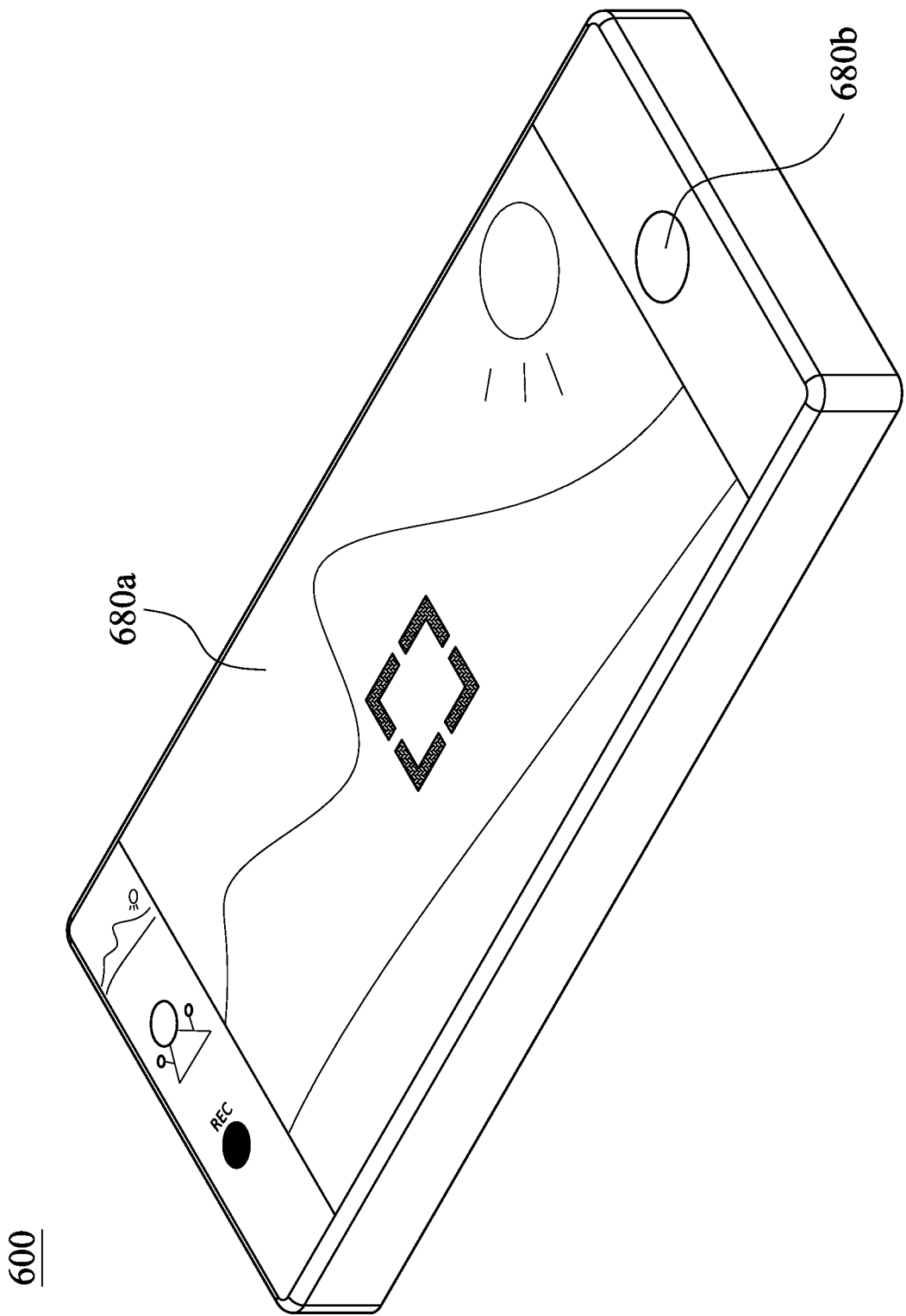
FIG. 6A is a schematic view of an electronic device according to the 6th embodiment of the present disclosure.
Figure 6B:
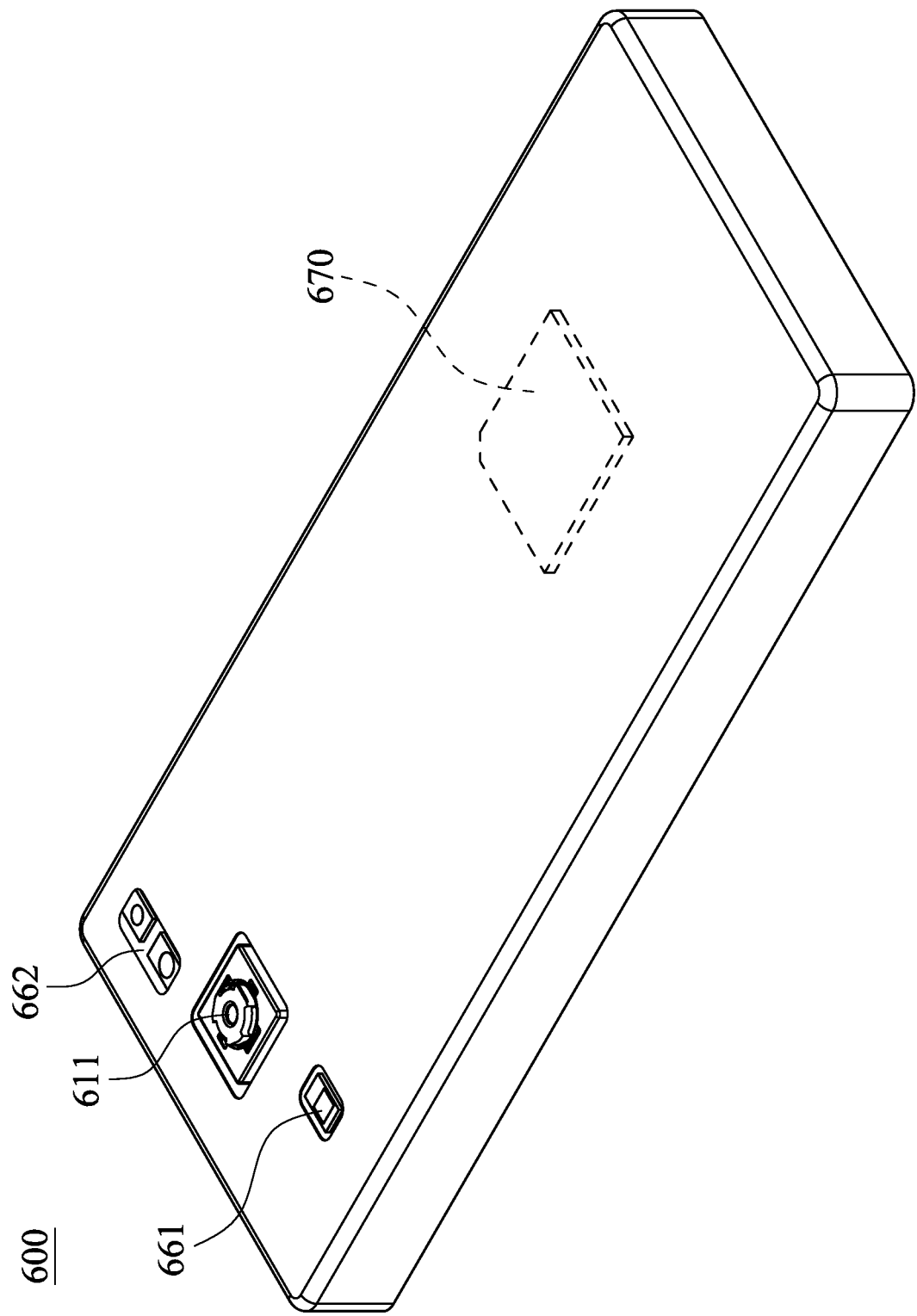
FIG. 6B is another schematic view of the electronic device according to the 6th embodiment in FIG. 6A.
Figure 6C:
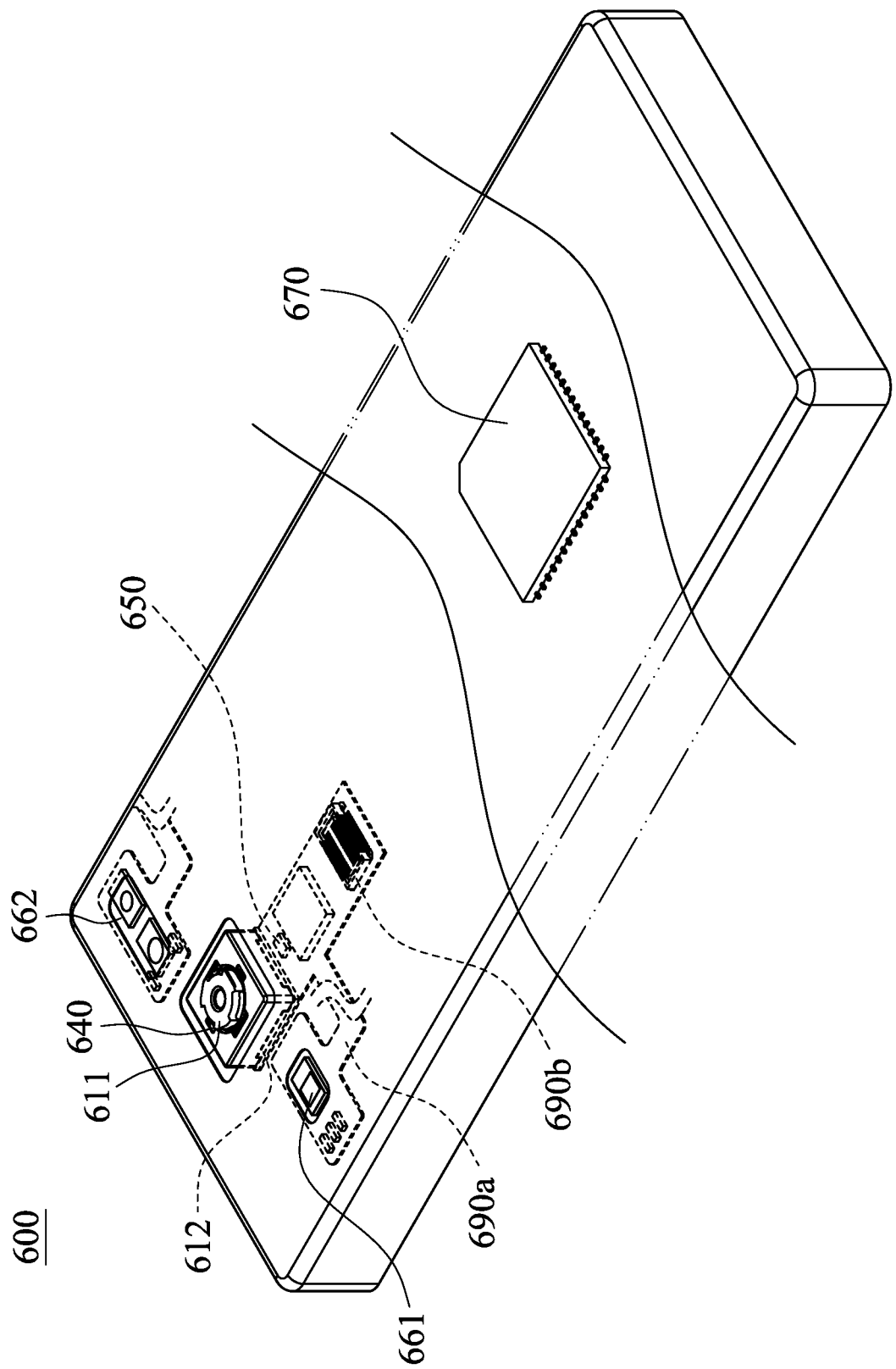
FIG. 6C is a schematic view of the elements of the electronic device according to the 6th embodiment in FIG. 6A.
Figure 6D:
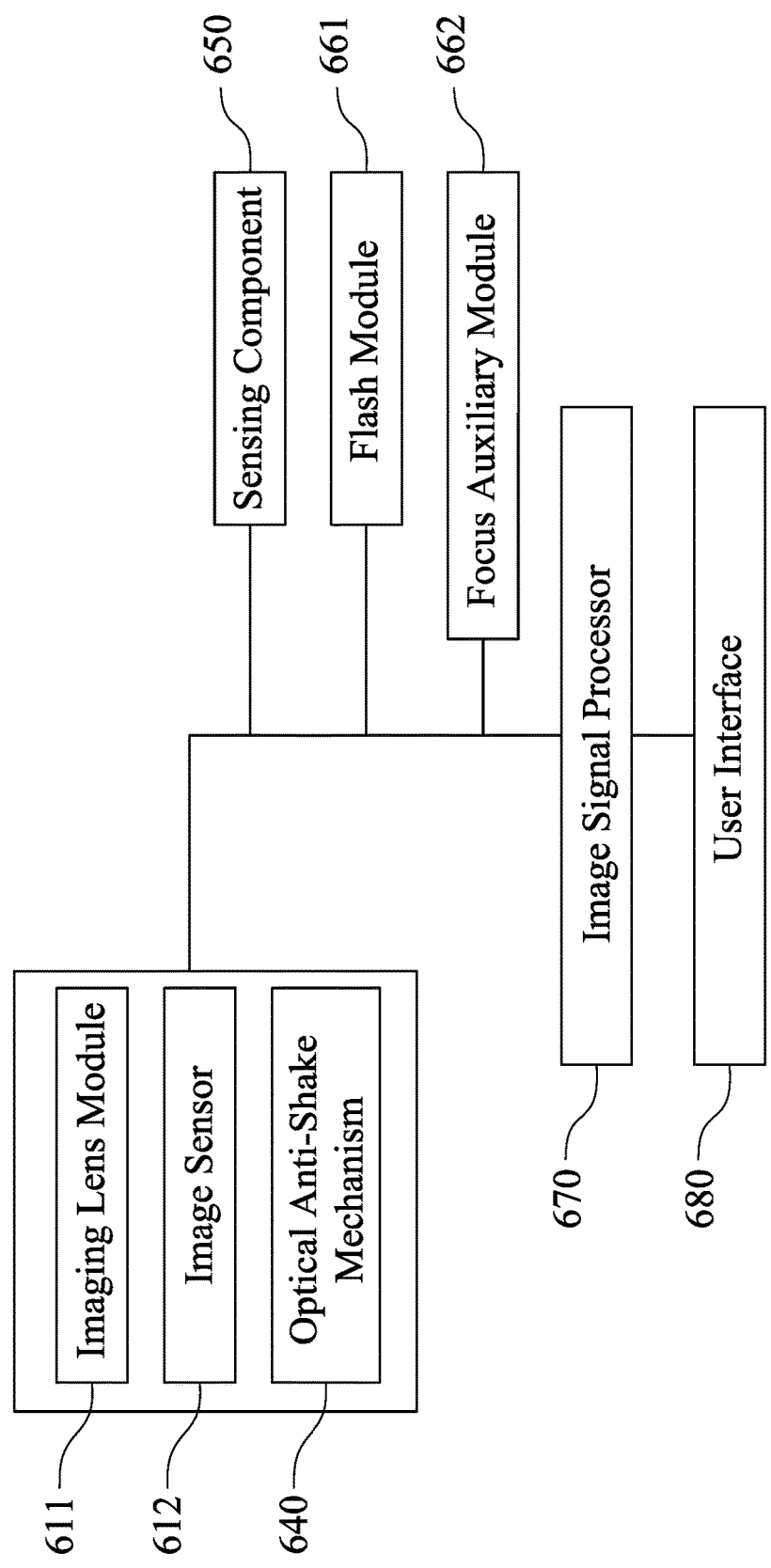
FIG. 6D is a block diagram of the electronic device according to the 6th embodiment in FIG. 6A.

FIG. 6A is a schematic view of an electronic device 600 according to the 6th embodiment of the present disclosure, FIG. 6B is another schematic view of the electronic device 600 according to the 6th embodiment in FIG. 6A, FIG. 6C is a schematic view of the elements of the electronic device 600 according to the 6th embodiment in FIG. 6A, and FIG. 6D is a block diagram of the electronic device 600 according to the 6th embodiment in FIG. 6A. As shown in FIG. 6A, FIG. 6B, FIG. 6C and FIG. 6D, the electronic device 600 of the 6th embodiment is a smartphone, the electronic device 600 includes the imaging lens module 611 according to any one of the 1st to 5th embodiments and an image sensor 612, wherein the image sensor 612 is disposed on an image surface (not shown) of the imaging lens module 611. Therefore, marketing demands for mass production and outward appearance of the electronic devices can be achieved.

Specifically, the user can activate the capturing mode by a user interface 680 of the electronic device 600, wherein the user interface of the 6th embodiment can be a touch screen 680a, a button 680b, etc. At this moment, the imaging lens module 611 collects imaging light on the image sensor 612 and outputs electronic signals associated with images to an image signal processor (ISP) 670.

Furthermore, in response to the camera specification of the electronic device 600, the electronic device 600 can further include an optical anti-shake mechanism 640, which can be an optical image stabilization (OIS) device. Moreover, the electronic device 600 can further include at least one auxiliary optical component (reference number is omitted) and at least one sensing component 650. In the 6th embodiment, the auxiliary optical component can be a flash module 661 and a focus auxiliary module 662, the flash module 661 is for compensating the color temperature, and the focus auxiliary module 662 can be an infrared distance measurement component, a laser focus module, etc. The sensing component 650 can have functions for sensing physical momentum and kinetic energies, such as an accelerator, a gyroscope, and a hall effect element, so as to sense shaking or jitters applied by hands of the user or external environments. Thus the autofocus function and the optical anti-shake mechanism 640 disposed on the electronic device 600 can function to obtain great image quality and facilitate the electronic device 600 according to the present disclosure to have a capturing function with multiple modes, such as taking optimized selfies, high dynamic range (HDR) with a low light source, 4K resolution recording, etc. Furthermore, the user can visually see the captured image of the camera through the touch screen and manually operate the view finding range on the touch screen to achieve the auto focus function of what you see is what you get.

Furthermore, as shown in FIG. 6C, the optical anti-shake mechanism 640, the sensing component 650, the flash module 661 and the focus auxiliary module 662 can be disposed on a flexible printed circuit board (FPC) 690a and electrically connected with the associated elements, such as an image signal processor 670, via a connector 690b so as to perform a capturing process. Because the current electronic devices, such as smartphone, have a tendency of being light and thin, the way of disposing the imaging lens module and related elements on the flexible printed circuit board and then integrating the circuit into the main board of the electronic device via the connector can satisfy the mechanical design of the limited space inside the electronic device and the layout requirements, and obtain more margins. The autofocus function of the imaging lens module can be controlled more flexibly via the touch screen of the electronic device. In other embodiments (not shown), the sensing components and the auxiliary optical components can also be disposed on the main board of the electronic device or carrier boards in other forms according to requirements of the mechanical design and the circuit layout.

Moreover, the electronic device 600 can further include, but not be limited to, a display, a control unit, a storage unit, a random-access memory (RAM), a read-only memory (ROM), or the combination thereof.

7TH EMBODIMENT

Figure 7:
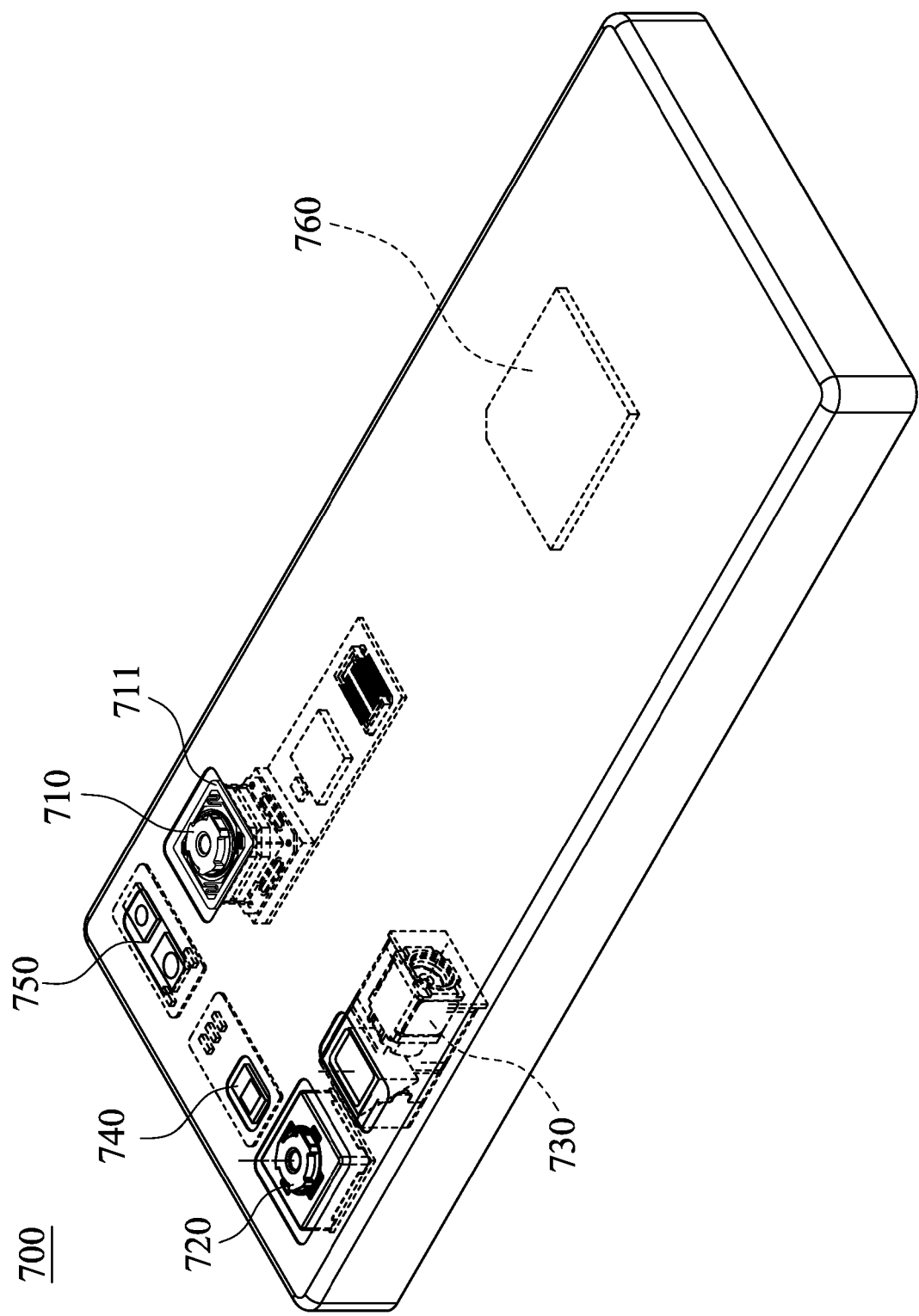
FIG. 7 is a schematic view of an electronic device according to the 7th embodiment of the present disclosure.

FIG. 7 is a schematic view of an electronic device 700 according to the 7th embodiment of the present disclosure. As shown in FIG. 7, the electronic device 700 is a smartphone, the electronic device 700 includes three imaging lens modules, that are an imaging lens module 710, an imaging lens module 720, an imaging lens module 730, a flash module 740, a focus auxiliary module 750, an image signal processor 760, an user interface (not shown in figures) and an image software processor (not shown), wherein all of the imaging lens module 710, the imaging lens module 720, the imaging lens module 730 are facing toward the same side (that is, the object side thereof). When the user captures images of an imaged object via the user interface, the electronic device 700 focuses and generates an image via the imaging lens module 710, the imaging lens module 720 and the imaging lens module 730 while compensating for low illumination via the flash module 740 when necessary. Then, the electronic device 700 quickly focuses on the imaged object according to its object distance information provided by the focus auxiliary module 750, and optimizes the image via the image signal processor 760 and the image software processor. Thus, the image quality of the imaging lens module 710, the imaging lens module 720 and the imaging lens module 730 can be further enhanced. The focus auxiliary module 750 can adopt conventional infrared or laser focusing auxiliary system for obtaining quick focusing, and the user interface can take a utilize screen or a physical button for capturing and processing the image with various functions of the image processing software.

In the 7th embodiment, the imaging lens module 710, the imaging lens module 720 and the imaging lens module 730 can be any one according to the 1st embodiment to the 5th embodiments, and the present disclosure is not limited thereto.

Furthermore, in the 7th embodiment, an optical anti-shake mechanism 711 is disposed on an outer side of the imaging lens module 710, and the optical anti-shake mechanism 711 can be an optical image stabilization device. The imaging lens module 730 is a telephoto lens, and the present disclosure is not limited thereto.

8TH EMBODIMENT

Figure 8:
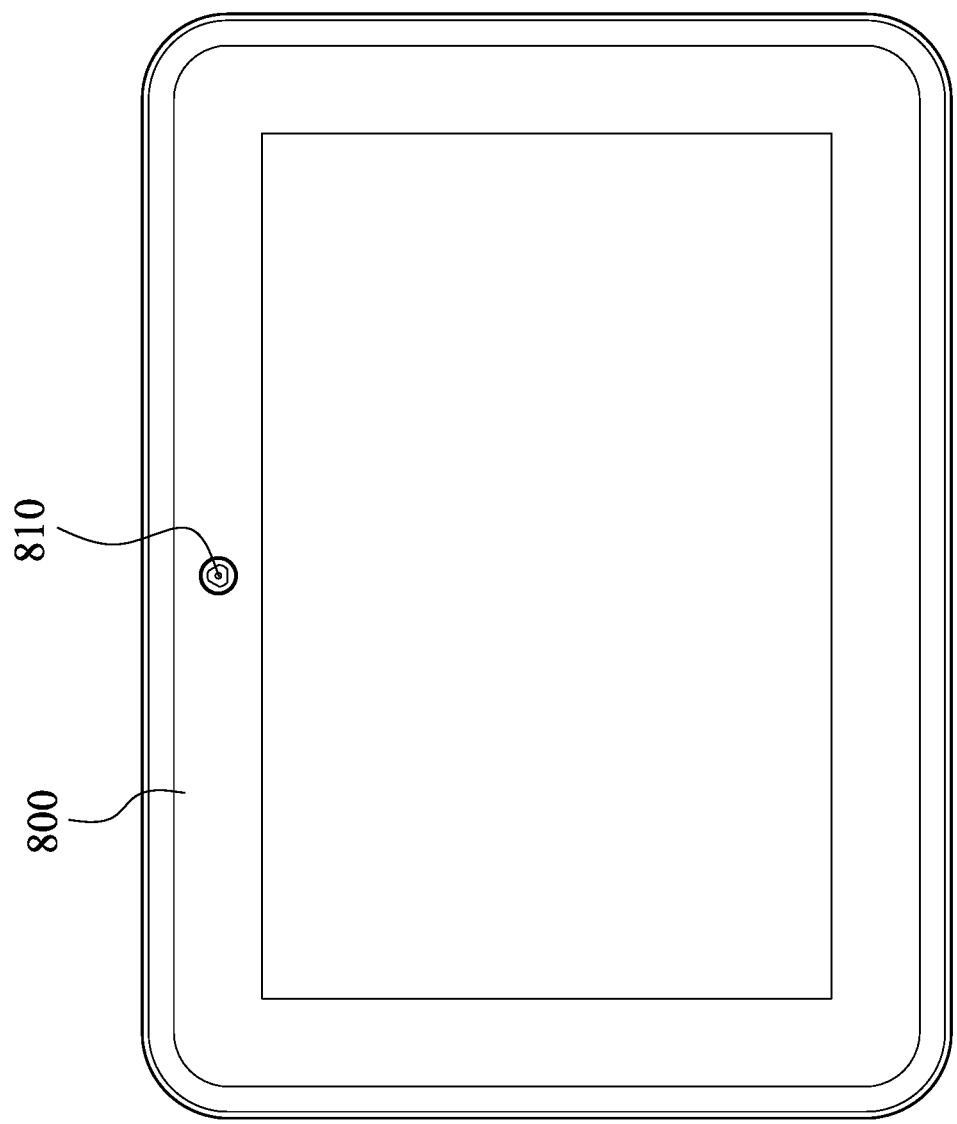
FIG. 8 is a schematic view of an electronic device according to the 8th embodiment of the present disclosure.

FIG. 8 is a schematic view of an electronic device 800 according to the 8th embodiment of the present disclosure. The electronic device 800 of the 8th embodiment is a tablet, and the electronic device 800 includes an imaging lens module 810 according to the present disclosure (not shown) and an image sensor (not shown), wherein the image sensor is disposed on an image surface (not shown) of the imaging lens module 810.

9TH EMBODIMENT

Figure 9:
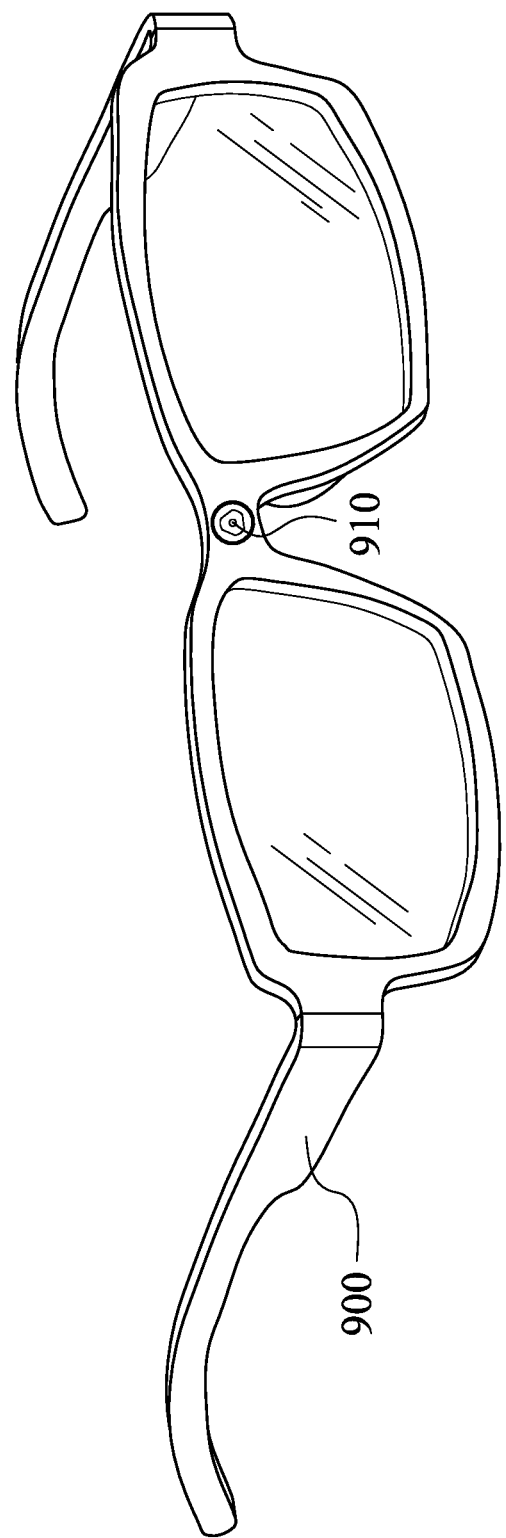
FIG. 9 is a schematic view of an electronic device according to the 9th embodiment of the present disclosure.

FIG. 9 is a schematic view of an electronic device 900 according to the 9th embodiment of the present disclosure. The electronic device 900 of the 9th embodiment is a wearable device, and the electronic device 900 includes an imaging lens module 910 according to the present disclosure (not shown) and an image sensor (not shown), wherein the image sensor is disposed on an image surface (not shown) of the imaging lens module 910.

The foregoing description, for purpose of explanation, has been described with reference to specific embodiments. It is to be noted that Tables 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens module, comprising at least one plastic lens element having an optical axis, an object side and an image side, wherein the at least one plastic lens element comprises, in order from a center to a peripheral region thereof:

an optical effective portion, wherein the optical axis passes through the optical effective portion; and an outer peripheral portion surrounding the optical effective portion, wherein the outer peripheral portion comprises, on at least one of the object side and the image side:

a plurality of groove structures;

a contacting surface being an annular plane and perpendicular to the optical axis, wherein the contacting surface is connected to at least one optical element adjacent thereto; and a plurality of separation surfaces respectively surrounding each of the groove structures;

wherein the groove structures and the contacting surface are located on the same side, there is an air gap between the groove structures and at least one optical element adjacent thereto, and the groove structures and the contacting surface located on the same side are not overlapped along a direction parallel to the optical axis;

wherein a number of the groove structures located on the one of the object side and the image side is N1, and the following condition is satisfied:

$$30 \leq N1 \leq 720.$$

2. The imaging lens module of claim 1, wherein at least one of the groove structures comprises a light absorbing layer.

3. The imaging lens module of claim 1, wherein the groove structures located on the one of the object side and the image side provided off the optical axis and the optical effective portion of the at least one plastic lens element on the other side of the object side and the image side are overlapped along a direction parallel to the optical axis.

4. The imaging lens module of claim 1, wherein each of the groove structures comprises a first structure, a second structure and a step surface, and the step surface is disposed between the first structure and the second structure.

5. The imaging lens module of claim 4, wherein a depth of the first structure is Shulepova, a depth of the second structure is Kang, and the following condition is satisfied:

$$0.3 < \text{Shulepova}/\text{Kang} < 3.$$

6. The imaging lens module of claim 1, wherein the outer peripheral portion comprises, on the other of the object side and the image side, a plurality of groove structures.

7. The imaging lens module of claim 6, wherein a number of the groove structures on the other of the object side and the image side is N2, and the following condition is satisfied:

$$30 \leq N2 \leq 720.$$

8. An electronic device, comprising:

the imaging lens module of claim 1; and an image sensor disposed on an image surface of the imaging lens module.

9. The imaging lens module of claim 1, wherein the groove structures are arranged along a circumference direction surrounding the optical axis.

10. The imaging lens module of claim 9, wherein at least three of the groove structures are arranged along a radial direction of the optical axis.

11. The imaging lens module of claim 9, wherein a maximum outer diameter of the optical effective portion on the object side and on the image side is φ1, a minimum inner diameter of the groove structures on the object side and on the image side is φ3, and the following condition is satisfied:

$$\varphi 3 < \varphi 1.$$

12. The imaging lens module of claim 1, wherein the contacting surface comprises:
a conical surface contacting with a lens element adjacent thereto, so that the plastic lens element is concentric alignment to the lens element adjacent thereto.

13. The imaging lens module of claim 12, wherein the conical surface is farther from the optical axis than the groove structures.

14. The imaging lens module of claim 12, wherein the conical surface is disposed between the groove structures and the optical effective portion along a direction perpendicular to the optical axis.

15. An imaging lens module, comprising at least one plastic lens element having an optical axis, an object side and an image side, wherein the at least one plastic lens element comprises, in order from a center to a peripheral region thereof:
an optical effective portion, wherein the optical axis passes through the optical effective portion; and
an outer peripheral portion surrounding the optical effective portion, wherein the outer peripheral portion comprises, on each of the object side and the image side:
a plurality of groove structures, wherein the groove structures arrange along a circumference direction surrounding the optical axis; and
a plurality of separation surfaces respectively surrounding each of the groove structures;
wherein a number of the groove structures located on the object side is N1, and the following condition is satisfied:

$30 \leq N1 \leq 720.$

16. The imaging lens module of claim 15, wherein in the groove structures respectively disposed on the object side and on the image side, at least three of the groove structures are arranged along a radial direction of the optical axis.

17. The imaging lens module of claim 15, wherein at least one of the groove structures respectively located on the object side and on the image side comprises a light absorbing layer.

18. The imaging lens module of claim 15, wherein the groove structures located on one of the object side and the image side provided off the optical axis and the optical effective portion of the at least one plastic lens element on the other side of the object side and the image side are overlapped along a direction parallel to the optical axis.

19. The imaging lens module of claim 15, wherein the groove structures located on the object side and the groove structures located on the image side are alternately arranged along a circumference direction surrounding the optical axis and are not overlapped along a direction parallel to the optical axis.

20. The imaging lens module of claim 15, wherein a maximum outer diameter of the optical effective portion on the object side and on the image side is $\varphi 1$, a maximum outer diameter of the groove structures on the object side and on the image side is $\varphi 2$, a minimum inner diameter of the groove structures on the object side and on the image side is $\varphi 3$, and the following condition is satisfied:

$0.05 < (\varphi 2 - \varphi 3)/\varphi 1 < 1.0.$

21. The imaging lens module of claim 15, wherein a maximum width of the outer peripheral portion parallel to the optical axis is Wmax, a maximum depth of the groove structures is d, and the following condition is satisfied:

$0.05 < d/Wmax < 0.55.$

22. The imaging lens module of claim 15, wherein a total number of the groove structures located on the image side is N1, and the following condition is satisfied:

$30 \leq N1 \leq 720.$

23. The imaging lens module of claim 15, wherein each of the groove structures comprises an opening, each of the groove structures is communicated to the opening and is recessed toward the plastic lens element along the optical axis.

24. The imaging lens module of claim 23, wherein a shape of the opening of each groove structure is rectangular-shaped.

* * * * *